United States Patent
Weng et al.

(10) Patent No.: US 8,457,549 B2
(45) Date of Patent: Jun. 4, 2013

(54) MULTI-USER MIMO RELAY PROTOCOL WITH SELF-INTERFERENCE CANCELLATION

(75) Inventors: Lingfan Weng, Hong Kong (CN); Ross David Murch, Hong Kong (CN)

(73) Assignee: Lingna Holdings Pte., LLC, Wilmington, DE (US)

( * ) Notice: Subject to any disclaimer, the term of this patent is extended or adjusted under 35 U.S.C. 154(b) by 920 days.

(21) Appl. No.: 12/039,927

(22) Filed: Feb. 29, 2008

(65) Prior Publication Data
US 2009/0221231 A1 Sep. 3, 2009

(51) Int. Cl.
*H04B 7/14* (2006.01)

(52) U.S. Cl.
USPC ............... 455/15; 455/7; 455/63.1

(58) Field of Classification Search
USPC ............. 455/7, 11.1, 13.1, 15, 522, 435, 426, 455/296, 501, 63.1, 426.1, 69, 502, 500, 455/450, 434, 453, 436; 370/210, 335, 321, 370/314, 336, 480, 241–243, 337, 517, 347; 375/232, 148, E1.03, 260, 130, 240.19
See application file for complete search history.

(56) References Cited

U.S. PATENT DOCUMENTS

| | | | | |
|---|---|---|---|---|
| 5,541,979 A * | 7/1996 | Leslie et al. | ................ | 455/436 |
| 6,011,952 A * | 1/2000 | Dankberg et al. | ............... | 455/24 |
| 6,047,187 A * | 4/2000 | Haartsen | ...................... | 455/450 |
| 6,430,158 B1 * | 8/2002 | Sugita | ........................... | 370/242 |
| 6,574,204 B1 * | 6/2003 | Lee | ............................... | 370/335 |
| 7,139,251 B1 * | 11/2006 | Varma | ............................ | 370/280 |
| 7,177,341 B2 * | 2/2007 | McCorkle | .................... | 375/130 |
| 7,221,956 B2 * | 5/2007 | Medvedev et al. | ............ | 455/522 |
| 7,283,817 B2 * | 10/2007 | Salo et al. | ................... | 455/426.1 |
| 7,403,497 B2 * | 7/2008 | Miao | ................................ | 370/321 |
| 2004/0235506 A1 * | 11/2004 | Roettger et al. | .............. | 455/502 |
| 2005/0009551 A1 * | 1/2005 | Tsai et al. | ..................... | 455/522 |
| 2006/0141933 A1 * | 6/2006 | Smee et al. | ................... | 455/63.1 |
| 2007/0036071 A1 * | 2/2007 | Herdin | ........................... | 370/210 |
| 2008/0009256 A1 * | 1/2008 | Anderson | ....................... | 455/296 |
| 2008/0013520 A1 * | 1/2008 | Liu et al. | ........................ | 370/347 |
| 2008/0013610 A1 * | 1/2008 | Varadarajan et al. | .......... | 375/221 |
| 2008/0025323 A1 * | 1/2008 | Khan | ............................. | 370/400 |

(Continued)

OTHER PUBLICATIONS

Pabst, et al. "Relay-based deployment concepts for wireless and mobile broadband cellular radio" (Sep. 2004) Communication Magazine, vol. 42, pp. 80-89.

(Continued)

*Primary Examiner* — Edward Urban
*Assistant Examiner* — Golam Sorowar
(74) *Attorney, Agent, or Firm* — Turocy & Watson, LLP

(57) ABSTRACT

Systems and methodologies for employing a multi-user Multiple Input Multiple Output (MIMO) relay protocol with self-interference cancellation in a wireless communication environment are provided herein. Data streams sent between user device(s) and base station(s) can traverse through a relay. Further, a decode and forward protocol can be employed by the relay rather than merely amplifying and forwarding the data streams. Moreover, each user device can listen to and decode data stream(s) sent by other user device(s) to the relay, and these decoded data stream(s) can be utilized for interference cancellation. Further, the user device(s) and the base station(s) can employ self-interference cancellation upon signals received from the relay. According to another example, an adaptive relay power allocation algorithm, which enhances power efficiency, can be leveraged by the relay for transmitting signals to the user device(s) and the base station(s).

30 Claims, 13 Drawing Sheets

U.S. PATENT DOCUMENTS

| | | | |
|---|---|---|---|
| 2008/0108377 A1* | 5/2008 | Yoon | 455/501 |
| 2008/0125032 A1* | 5/2008 | Jung et al. | 455/7 |
| 2008/0175183 A1* | 7/2008 | Devroye et al. | 370/315 |
| 2008/0182542 A1* | 7/2008 | Choi et al. | 455/296 |

OTHER PUBLICATIONS

Sreng, et al. "Relayer Selection Strategies in Cellular Network with Peer-to-Peer Relaying" (Oct. 2003) Proceedings of IEEE VCT Fall'03, Orlando, FL.

Wu, et al. "Integrated Cellular and Ad Hoc Relaying Systems iCAR" (Oct. 2001) Journal on Selected Areas in Communications, vol. 19 pp. 2105-2115.

Shannon, "Two-way communication channels" (1961) Procceedings of 4th Berkeley Symp. Math Stat. and Prob, vol. 1, pp. 611-644.

Rankov, et al. "Spectral Efficient Protocols for Nonregenerative Half-duplex Relaying" (Sep. 2005) Proceedings of Allerton Conference of Communication, Control and Computing.

Chen, et al. "A cross layer method for interference cancellation and network coding in wireless networks" (Jun. 2006) Proceedings of IEEE ICC'06, Istanbule, Turkey.

Tse, et al. "Fundamentals of Wireless Communication" (2005) Cambridge University Press, pp. 183-185, 204-209, 228-232, 241-242, 275 and 332-333.

Wang, et al. "On the capacity of MIMO relay channels" (Jan. 2005) IEEE Transactions on Information Theory, vol. 51, pp. 29-42.

Munoz, et al. "Non-regenerative MIMO relaying with channel state information" (Mar. 2005) Proceedings of IEEE International Conference on Acoustics, Speech, and Signal Processing, Philadelphia, PA.

Bolcskei, et al. "Capacity scaling laws in MIMO relay networks" (Jun. 2006) IEEE Transactions on Wireless Communications, vol. 5, pp. 1433-1444.

Tang, et al. "On Achievable Sum Rates of a Multiuser MIMO Relay Channel" (Jul. 2006) Proceedings of IEEE ISIT'06, Seattle, WA.

Viswanath, et al. "Sum Capacity of the vector Gaussian broadcast channel and uplink-downlink duality" (Aug. 2003) IEEE Transactions on Information Theory, vol. 49, pp. 1912-1921.

Caire, et al. "On the achievable throughput of a multiantenna Gausian broadcast channel" (Jul. 2003) IEEE Transactions on Information Theory, vol. 49, pp. 1691-1706.

\* cited by examiner

MULTI-USER MIMO RELAY PROTOCOL WITH SELF-INTERFERENCE CANCELLATION

TECHNICAL FIELD

The present disclosure relates generally to wireless communications, and more particularly to a multi-user Multiple Input Multiple Output (MIMO) relay protocol that utilizes self-information to mitigate interference in a wireless communication system.

BACKGROUND

In the area of wireless communications, efforts have been made to develop network infrastructures for next generation wireless communication systems. In general, these next generation wireless communication systems tend to yield increased data rates. Significantly higher data rates, however, can impose serious power implications. The power implications can result from per symbol energy decreasing linearly with increasing data rate given a fixed transmit power. Accordingly, relay based multi-hop wireless networks, which have attracted recent research and industry interest, can provide economically justifiable solutions to address the foregoing.

Relays typically operate in half-duplex mode, and thus, utilization of relays in wireless networks can yield various disadvantages that can detrimentally impact wireless communication system performance. For instance, when relays utilize half-duplex operation, they are unable to transmit and receive at the same time. Moreover, part of the radio resource can be allocated for transmission between relays and user devices (e.g., mobiles, user equipment, mobile terminals, . . . ) while a separate portion of the radio resource can be allotted for transmission between relays and base stations; the division of the radio resource can considerably reduce system throughput. These obstacles hinder development of relay based wireless multi-hop networks.

A variety of techniques have been examined that attempt to mitigate deleterious effects of relays. An example of such a technique leverages reusing channels from neighboring cells, while a further example utilizes unlicensed spectrum for the relay to mobile link. Another conventional method is to consider two-way communications where both the base station and the user device intend to transmit data to each other.

Multiple Input Multiple Output (MIMO) has also been regarded as a technique which can be utilized to realize higher data rates (e.g., gigabit data rates, . . . ) in next generation wireless communication systems. However, more antennas are likely to be installed at base stations and relays rather than user devices. Conventional MIMO relay systems typically employ a relay that oftentimes only communicates with a single user. Further, common MIMO relay systems oftentimes employ an amplify and forward relay protocol, in which the relay simply processes received signals by performing matrix multiplication, which can cause increased noise levels that can limit performance. Accordingly, there exists a need for improved MIMO relay techniques in a wireless communication system.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies for employing a multi-user Multiple Input Multiple Output (MIMO) relay protocol with self-interference cancellation in a wireless communication environment are provided herein. Data streams sent between user device(s) and base station(s) can traverse through a relay. Further, a decode and forward protocol can be employed by the relay rather than merely amplifying and forwarding the data streams. Moreover, each user device can listen to and decode data stream(s) sent by other user device(s) to the relay, and these decoded data stream(s) can be utilized for interference cancellation. Further, the user device(s) and the base station(s) can employ self-interference cancellation upon signals received from the relay. According to another example, an adaptive relay power allocation algorithm, which enhances power efficiency, can be leveraged by the relay for transmitting signals to the user device(s) and the base station(s).

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
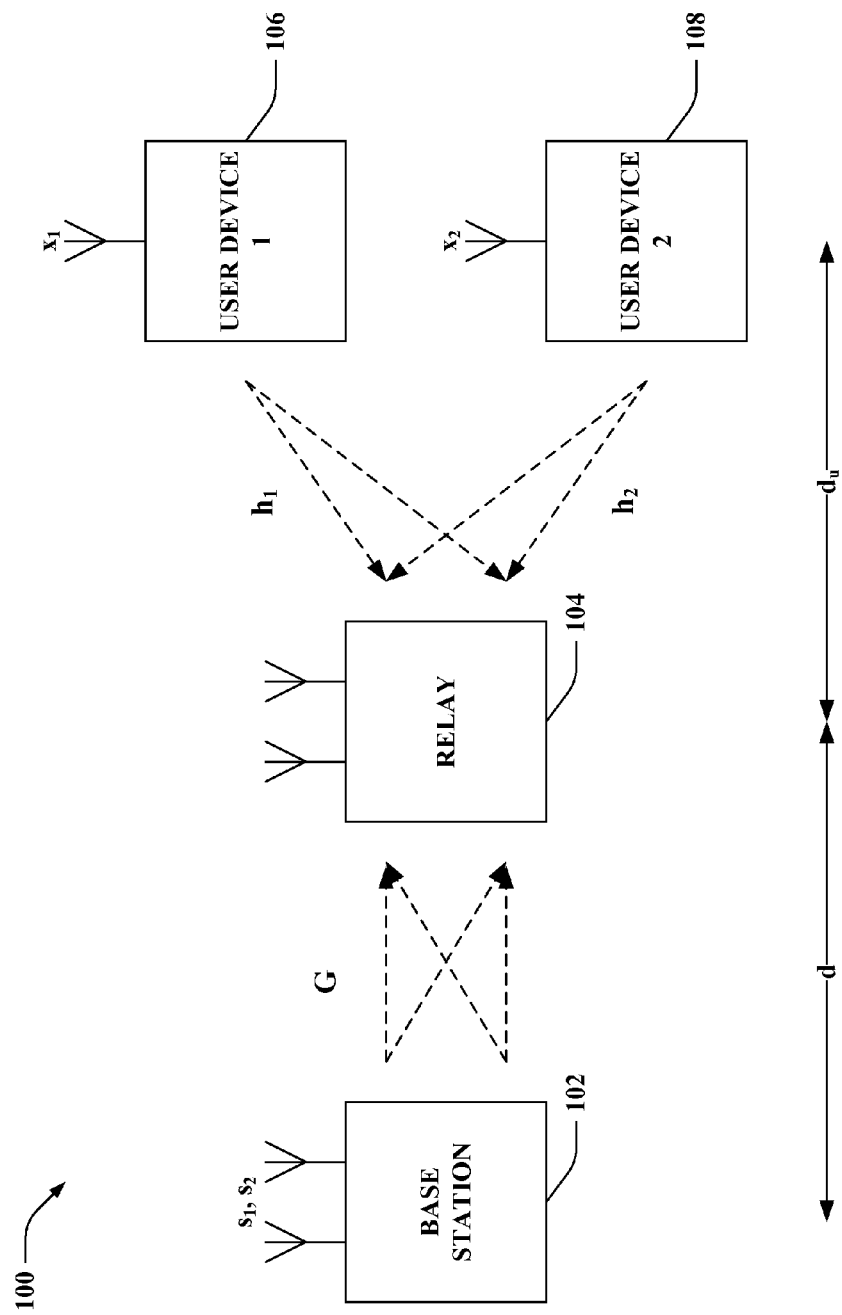
FIG. 1 is an illustration of an example system that employs a multi-user Multiple Input Multiple Output (MIMO) relay protocol in a wireless communication environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i. e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Various embodiments described herein support data rates that are higher than data rates utilized for typical 3G systems. To enable yielding these greater data rates, systems and methods described herein can efficiently utilize radio resources. Relay and Multiple Input Multiple Output (MIMO) techniques can significantly enhance system power efficiency, extend system coverage and the like for next generation wireless communication systems. In various embodiments described in more detail below, a multi-user MIMO relay protocol which utilizes self-information to subtract interference in two-way communication systems can be employed. This protocol can yield significant capacity gain compared to conventional techniques. Further, adaptive relay power allocation can additionally or alternatively be utilized to further increase system power efficiency.

Now referring to FIG. 1, illustrated is a system 100 that employs a multi-user Multiple Input Multiple Output (MIMO) relay protocol in a wireless communication environment. The system 100 includes a base station 102, a relay 104, and a plurality of user devices (e.g., a user device 1 106 and a user device 2 108). Although two user devices 106-108 are illustrated to be communicating with the base station 102 via the relay 104, it is contemplated that the base station 102 can communicate, by way of the relay 104, with substantially any number of user devices (e.g., one user device, more than two user devices, . . . ), each of which can be substantially similar to user devices 106-108. It is to be appreciated that each of the user devices 106-108 can be referred to as an access terminal, a mobile, a mobile station, a mobile device, a user terminal, a wireless communication device, a remote terminal, and so forth. Further, each of the user devices 106-108 can be a telephone (e.g., cellular, wireless, . . . ), a personal digital assistant (PDA), a computing device (e.g., laptop, handheld, desktop, . . . ), a smart phone, or the like. Although not depicted, it is to be appreciated that the base station 102, the relay 104, and each user device 106-108 can include various components associated with receiving and transmitting signals; these components can include, but are not limited to, processors, memory, modulators, multiplexers, demodulators, demultiplexers, etc.

The system 100 is a two-way multi-user MIMO communication system that employs a relay protocol which utilizes self-interference cancellation. More particularly, the system 100 can leverage a decode and forward protocol rather than an amplify and forward protocol oftentimes used in connection with conventional techniques. When using a conventional amplify and forward protocol, noise levels introduced by analog repeaters can limit system performance. In contrast, the decode and forward protocol employed by the system 100 can achieve significantly enhanced performance (e.g., system capacity gain, . . . ) compared to conventional multi-user MIMO relay protocols. Also, the system 100 can further enhance system power efficiency based upon uplink and downlink duality.

The base station 102 can communicate with the relay 104 (e.g., data can be wirelessly transferred from the base station 102 to the relay 104 and/or from the relay 104 to the base station 102). Moreover, the relay 104 can communicate with each user device 106-108 (e.g., data can be wirelessly transferred from the relay 104 to the user device 1 106, from the relay 104 to the user device 2 108, from the user device 1 106 to the relay 104, and/or from the user device 2 108 to the relay 104). As depicted, the base station 102 and the relay 104 can each be equipped with two antennas while each of the user devices 106-108 can have one antenna. It is to be appreciated, however, that the claimed subject matter is not limited to the base station 102 including two antennas, the relay 104 including two antennas, and/or each of the user devices 106-108 including one antenna.

The system 100 can be a Time Division Duplex (TDD) system where a common frequency band can be shared in a time-based manner (e.g., divided into several recurrent timeslots of fixed lengths) for communicating over each of the various channels (e.g., channel between the base station 102 and the relay 104, channel between the relay 104 and the user device 1 106, channel between the relay 104 and the user device 2 108, . . . ). According to an example, the base station 102 can transmit two data streams $s_1$ and $s_2$ directed to the user device 1 106 and the user device 2 108, respectively. Following this example, the user device 1 106 and the user device 2 108 can simultaneously transmit data streams $x_1$ and $x_2$, respectively, each directed to the base station 102 (e.g., $s_1$ and $x_1$ can be concurrently transmitted, $s_2$ and $x_2$ can be concurrently transmitted, . . . ). Further, all of these data streams are transmitted through the relay 104 and there is no direct link between the base station 102 and the user devices 106-108.

The two user devices 106-108 can be assumed to be located in close proximity to each other such that each user device 106-108 can successfully decode data transmitted from the other user device 106-108 at any time. Further, the distance from each user device 106-108 to the relay 104 can be substantially similar, and this distance is referred to as $d_u$. Moreover, the distance between the base station 102 and the relay 104 is denoted as d.

According to another illustration, the channel between the base station 102 and the relay 104 is referred to as G, the channel between the user device 1 106 and the relay 104 is denoted $h_1$, and the channel between the user device 2 108 and the relay 104 is referred to as $h_2$. Further, let $$G = \gamma \begin{bmatrix} g_{11} & g_{12} \\ g_{21} & g_{22} \end{bmatrix}, h_1 = \gamma_u [h_{11} \ h_{12}]^T,$$

and $h_2 = \gamma_u [h_{21} \ h_{22}]^T$. Here, the superscript T denotes the matrix transpose. Moreover, $\gamma$ and $\gamma_u$ are the square roots of the path loss from the base station 102 to the relay 104 and the path loss from the user devices 106-108 to the relay 104, respectively. The path loss exponent can be set to be four (e.g., $\gamma^2 \propto 1/d^4$ and $\gamma_u^2 \propto 1/d_u^4$). The elements $\{h_{ij}, g_{ij}; i=1,2; j=1,2\}$ are assumed to be independent zero mean complex Gaussian random variables with unit variance. Additionally, the channels can be assumed to be quasi-static (e.g., they are constant during one TDD frame but change independently between different frames) and the channel state information can be known at the transmitter.

A feature of two-way communication is the ability to utilize self-information to cancel out interference so as to increase system capacity, which can be illustrated by the following example. Assume a single base station 102 and a single user device (e.g., the user devices 1 106, although utilization of the user device 2 108 or any disparate user device (not shown) is contemplated) transmit to each other through the relay 104. The relay 104 can first receive data streams from both the base station 102 and the user device 1 106. Then, the relay 104 can superimpose these two data streams and broadcast. At the base station 102, due to the fact that it has information of the data stream that the relay 104 is transmitting to the user device 1 106, the base station 102 can cancel out the corresponding interference introduced by that data stream. Thus, the relay 104 to base station 102 channel is interference-free and significant capacity gain can be obtained. Moreover, the relay 104 to user device 1 106 link can be processed in a similar fashion. It is to be appreciated, however, that the claimed subject matter is not limited to the foregoing example.

The system 100 can employ a multi-user MIMO relay protocol with self-interference cancellation (e.g., also referred to as a two-way relay protocol) as described herein. In contrast, some conventional techniques use a simple decode and forward protocol (e.g., referred to as the original protocol) while other common techniques use a relay waterfilling amplify and forward protocol (e.g., referred to as the relay waterfilling AF protocol).

Figure 2:
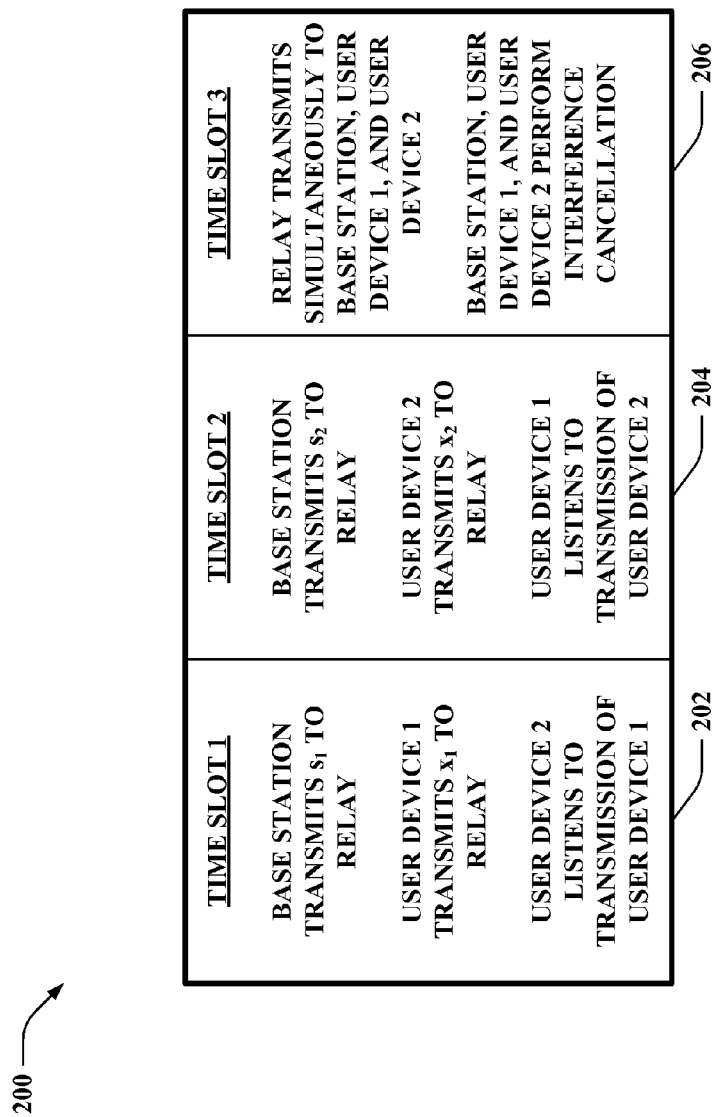
FIG. 2 is an illustration of an example chart representing a TDD frame utilized with the two-way relay protocol that includes a plurality of time slots.

Turning to FIG. 2, illustrated is an example chart 200 representing a TDD frame utilized with the two-way relay protocol that includes a plurality of time slots (e.g., three time slots). The chart 200 depicts the protocol used by the system 100 of FIG. 1, and thus, refers to components of the system 100 (e.g., the base station 102, the relay 104, the user device 1 106, and the user device 2 108). However, it is to be appreciated that the claimed subject matter is not limited to the two-way relay protocol being employed in such a wireless communication system.

The TDD frame can be equally divided into three time slots: time slot 1 202, time slot 2 204, and time slot 3 206. In time slot 1 202, the base station 102 transmits data stream Si to the relay 104 with power $P_B = E[s_1^H s_1]$. At the same time, user device 1 106 also transmits data stream $x_1$ to the relay 104 with power $P_u = E[x_1^H x_1]$. Here, the superscript H denotes the Hermitian transpose and E[.] is the expectation operator. The user device 2 108 listens to the transmission of the user device 1 106 (e.g., the user device 2 108 decodes data stream $x_1$) and can use the decoded information to cancel out interference in the third time slot 206. As a result, the received signal at the relay 104 in the first time slot 202 can be expressed as $y_R^{(1)} = \gamma G s_1 + \gamma_u h_1 x_1 + n_R^{(1)}$, where $n_R^{(1)}$ is the receiver noise.

In time slot 2 204, the base station 102 transmits data stream $s_2$ to the relay 104 with power $P_B = E[s_2^H s_2]$. At the same time, the user device 2 108 also transmits data stream $x_2$ to the relay 104 with power $P_u = E[x_2^H x_2]$. Also during time slot 2 204, the user device 1 106 listens to the transmission of the user device 2 108 (e.g., the user device 1 106 decodes data stream $x_2$) and can use the decoded information to cancel out interference in the third time slot 206. As a result, the received signal at the relay 104 in the second time slot 204 can be expressed as $y_R^{(2)} = \gamma G s_2 + \gamma_u h_2 x_2 + n_R^{(2)}$, where $n_R^{(2)}$ is the receiver noise.

In time slot 3 206, the relay 104 transmits to the base station 102 and the user devices 106-108 simultaneously by superimposing two data streams. Thus, the transmitted signal can be $b = b_x + b_s$, where $b_x$ is the data transmitted to the base station 102 and $b_s$ is the data transmitted to the user devices 106-108. Further, $b_x$ can be transmitted to the base station 102 with power $P_r^x = E[b_x^H b_x]$ and $b_s$ can be transmitted to the user devices 106-108 with power $P_r^s = E[b_s^H b_s]$. Since the base station 102 has knowledge of $b_s$, it can perform self-interference cancellation and the signal received at the base station 102 can be expressed as $y_B = \gamma G^H b_x + n_B$. Similarly, the user devices 106-108 can effectuate interference cancellation; more particularly, the user device 1 106 can utilize the decoded information obtained during time slot 2 204 (e.g., from the transmission by the user device 2 108) while the user device 2 108 can employ the decoded information obtained during time slot 1 202 (e.g., from the transmission by the user device 1 106) for canceling interference from the received signals. Thus, the signals received at the user device 1 106 and the user device 2 108 can respectively be expressed as:

$$y_1 = \gamma_u h_1^H b_x + n_1; \text{ and}$$

$$y_2 = \gamma_u h_2^H b_x + n_2.$$

In the above equations, $n_B$, $n_1$, and $n_2$ are all noises at the respective receivers.

The two-way relay protocol differs from the original protocol and the relay waterfilling AF protocol. The following provides an overview of the original protocol and the relay waterfilling AF protocol. The original protocol uses a TDD frame equally divided into four time slots. The first time slot is allocated for transmissions from base station to relay, the second time slot is used for transmissions from relay to two user devices, the third time slot is employed for transmissions from two user devices to relay, and the fourth time slot is allotted for transmissions from relay to base station in turn. The waterfilling algorithm can be applied to the channels between the base station and the relay, dirty paper coding can be applied to the relay to user devices channel and successive interference cancellation can be applied to the user devices to relay channel.

Moreover, the relay waterfilling AF protocol employs a TDD frame equally divided into four time slots. In the first time slot, the base station can transmit two data streams $s_1$ and $s_2$ with equal power on two eigenchannels of G. With the relay waterfilling AF protocol, the relay does not decode received data streams; rather, the relay linearly processes them by multiplying a 2-by-2 matrix. Then, in the second time slot, the relay transmits the processed signals to two user devices simultaneously. In the third and fourth time slots, data streams $x_1$ and $x_2$ are processed similarly (e.g., transmitted from the user devices to the relay in the third time slot and transferring the processed signals to the base station in the fourth time slot). Based on the channel state information, the relay can alter system capacity by adjusting matrix coefficients and user priorities.

Figure 3:
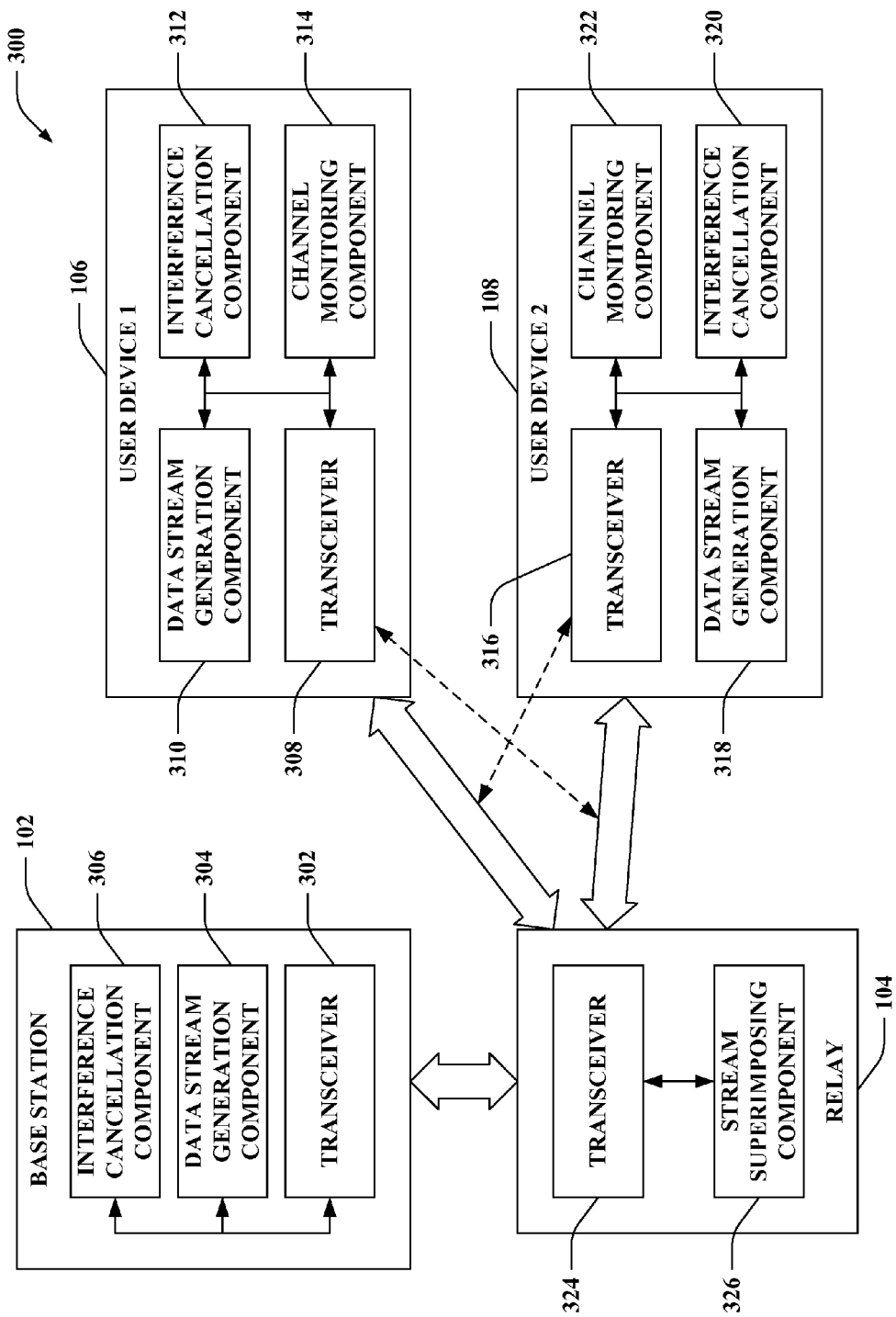
FIG. 3 is an illustration of an example system that employs a multi-user MIMO relay protocol with self-interference cancellation in a wireless communication environment.

With reference to FIG. 3, illustrated is a system 300 that employs a multi-user MIMO relay protocol with self-interference cancellation in a wireless communication environment. As depicted, the system 300 includes the base station 102, the relay 104, the user device 1 106, and the user device 2 108; however, it is to be appreciated that the claimed subject matter is not so limited. The base station 102 can communicate with the user devices 106-108 via the relay 104; thus, all data streams can traverse through the relay 104. Moreover, the base station 102, the relay 104, and the user devices 106-108 can operate with a common understanding of time (e.g., synchronized timing) to enable each device to perform appropriate actions during each time slot of a TDD frame as specified by the multi-user MIMO relay protocol with self-interference cancellation.

The base station 102 can include a transceiver 302, a data stream generation component 304, and an interference cancellation component 306. The transceiver 302 can be coupled to antenna(s) (not shown) of the base station 102. For instance, the transceiver 302 can receive signals from the antenna(s) (e.g., signals sent from the relay 104) and perform operations such as filtering, amplifying, demodulating, decoding, etc. upon such received signals. Further, the transceiver 302 can provide signals to the antenna(s) for transmission to the relay 104. Accordingly, the transceiver 302 can modulate, encode, etc. the signals for transfer to the relay 104.

The transceiver 302 can be coupled to the data stream generation component 304. The data stream generation component 304 of the base station 102 can yield a data stream that can be provided to the transceiver 302 for transferring to the user device(s) 106-108 via the relay 104. According to an illustration, the data stream generation component 304 can create a data stream $s_1$ to be communicated to the user device 1 106 and a data stream $s_2$ to be communicated to the user device 2 108. Additionally, the data stream generation component 304 (and/or the base station 102 in general) can allocate power level(s) to be utilized for sending each of the data stream(s). Further, the data streams $s_1$ and $s_2$ can be transferred to the relay 104 by the transceiver 302 in corresponding time slots as set forth by the two-way relay protocol described herein.

Further, the interference cancellation component 306 can be coupled to the data stream generation component 304 and the transceiver 302. The interference cancellation component 306 (and/or memory (not shown)) can retain data stream(s) (and/or information related thereto) produced by the data stream generation component 304. Further, the interference cancellation component 306 can obtain signal(s) transmitted from the relay 104 and received, processed, etc. by the transceiver 302. Since the interference cancellation component 306 has knowledge concerning the data stream(s) that the relay 104 is transmitting to the user devices 106-108 (e.g., data stream(s) originating from the data stream generation component 304, transmitted to the relay 104, and intended for the user device(s) 106-108), the interference cancellation component 306 can cancel out the corresponding interference introduced by those data stream(s) from the obtained signal(s) based upon this knowledge.

Moreover, the user device 1 106 can include a transceiver 308, a data stream generation component 310, an interference cancellation component 312 and a channel monitoring component 314. The transceiver 308 can be coupled to antenna(s) (not shown) of the user device 1 106. Moreover, the transceiver 308 can obtain signals from the antenna(s) (e.g., signals sent from the relay 104) and perform operations such as filtering, amplifying, demodulating, decoding, etc. upon such received signals. Further, the transceiver 308 can provide signals to the antenna(s) for transmission to the relay 104. Accordingly, the transceiver 308 can modulate, encode, etc. the signals for transfer to the relay 104. Moreover, the data stream generation component 310 can produce a data stream that can be provided to the transceiver 308 for transferring to the base station 102 via the relay 104. For instance, the data stream generation component 310 can yield a data stream $x_1$ for communicating in accordance with the two-way relay protocol. Additionally, the data stream generation component 310 (and/or the user device 1 106 in general) can allocate a power level to be utilized for sending the data stream.

Additionally, the interference cancellation component 312 (and/or memory (not shown)) can retain data stream(s) (and/or information related thereto) produced by the data stream generation component 310. Further, the interference cancellation component 312 can obtain signal(s) transmitted from the relay 104 and received, processed, etc. by the transceiver 308. Since the interference cancellation component 312 has information concerning the data stream(s) that the relay 104 is transmitting to the base station 102 originating from the user device 1 106 (e.g., data stream(s) originating from the data stream generation component 310, transmitted to the relay 104, and intended for the base station 102), the interference cancellation component 312 can cancel out the corresponding interference introduced by those data stream(s) from the obtained signal(s).

Further, the channel monitoring component 314 can listen to transmissions by disparate user device(s). For instance, the channel monitoring component 314 can enable the user device 1 106 to decode transmissions of the user device 2 108 (e.g., transmissions from the user device 2 108 to the relay 104 that are intended for the base station 102). The transceiver 308 can be utilized by the channel monitoring component 314 to obtain the transmissions of the user device 2 108 (as shown by the dotted line from the transceiver 308). The decoded transmissions from other user device(s) can thereafter be employed by the interference cancellation component 312 to remove interference from received signals obtained from the relay 104.

The user device 2 108 can include a transceiver 316, a data stream generation component 318 (e.g., that yields a data stream $x_2$, . . . ), an interference cancellation component 320 and a channel monitoring component 322, each of which can be substantially similar to the corresponding components of the user device 1 106. By way of further illustration, the channel monitoring component 314 of the user device 1 106 can use the transceiver 308 to obtain the data stream $x_2$ sent by the user device 2 108 to the relay 104; thereafter, the channel monitoring component 314 can evaluate the data stream $x_2$, and this evaluation can be leveraged to mitigate interference in signals received from the relay 104 using the interference cancellation component 312. Similarly, the channel monitoring component 322 of the user device 2 108 can employ the transceiver 316 to receive the data stream $x_1$ transferred by the user device 1 106 to the relay 104. The channel monitoring component 322 can analyze the data stream $x_1$ and the interference cancellation component 320 can mitigate interference in signals obtained from the relay 104 based upon this analysis.

Additionally, the relay 104 can include a transceiver 324 and a stream superimposing component 326. The transceiver 324 can be substantially similar to the transceivers 302, 308, and 316. Further, the transceiver 324 can enable the relay 104 to decode data streams received from the base station 102 and the user devices 106-108. Moreover, the stream superimposing component 326 superimposes received data streams that are to be forwarded. Thus, a resultant signal b can be yielded from the superimposing component 326, and this resultant signal can be provided to the transceiver 324 and thereafter transmitted to the base station 102 and the user devices 106-108 simultaneously. The resultant signal b can include data to be transmitted to the base station 102 (e.g., $b_x$) and data to be transmitted to the user devices 106-108 (e.g., $b_s$).

Moreover, the transceiver 324 (and/or a decoder included in the relay 104 and/or the relay 104 in general) can perform successive interference cancellation. Successive interference cancellation is a multi-user detection technique in which signals are detected sequentially based on perceived reliability of each signal in an aggregate received signal. The signal perceived as most reliable can be detected first, the detected signal can be regenerated and cancelled from the aggregate received signal to yield a resulting signal. Thereafter, the resulting signal can be used to detect a next most reliable signal, and so forth until all signals have been detected. The decoding order used for successive interference cancellation can be based on the perceived reliability of the signals.

In a first time slot of a TDD frame (e.g., the time slot 1 202 of FIG. 2), successive interference cancellation, which is a capacity-achieving approach for a multiple access channel, is performed at the relay. Depending on the decoding order, the capacity of a channel between the user device 1 106 and the relay 104 can be given by:

$$C_x^{(1)} = \frac{1}{3} \log \det\left(I + \frac{P_u}{\sigma^2} \gamma_u^2 h_1 h_1^H\right) \text{ or}$$

$$C_x^{(1)} = \frac{1}{3} \log \frac{\det\left(I + \frac{P_u}{\sigma^2} \gamma_u^2 h_1 h_1^H + \frac{P_B}{2\sigma^2} \gamma^2 GG^H\right)}{\det\left(I + \frac{P_B}{2\sigma^2} \gamma^2 GG^H\right)},$$

where $\sigma^2$ is the noise variance. The corresponding capacity of a channel between the base station 102 and the relay 104 can be:

$$C_s^{(1)} = \frac{1}{3} \log \frac{\det\left(I + \frac{P_u}{\sigma^2} \gamma_u^2 h_1 h_1^H + \frac{P_B}{2\sigma^2} \gamma^2 GG^H\right)}{\det\left(I + \frac{P_u}{\sigma^2} \gamma_u^2 h_1 h_1^H\right)} \text{ or}$$

$$C_s^{(1)} = \frac{1}{3} \log \det\left(I + \frac{P_B}{2\sigma^2} \gamma^2 GG^H\right).$$

Further, the decoding order that yields the larger sum capacity C (as described below) can be selected.

For a second time slot of the TDD frame (e.g., the time slot 2 204 of FIG. 2), a capacity of the user device 2 108 to relay 104 channel $C_x^{(2)}$ and a capacity of the base station 102 to relay 104 channel $C_s^{(2)}$ can be obtained similarly.

For a third time slot of the TDD frame (e.g., the time slot 3 206 of FIG. 2), the relay 104 to base station 102 channel is a 2-by-2 MIMO channel, whose capacity is achieved by the waterfilling algorithm. This capacity can be:

$$C_x^{(3)} = \frac{1}{3} \sum_{i=1}^{2} \log\left(1 + \frac{P_{ri}^x}{\sigma^2} \gamma^2 \lambda_i^2\right)$$

where $\lambda_i$ is the i-th eigenvalue of G and $P_{ri}^x$ is the power allocated to the i-th eigenchannel of G. The relay 104 to user devices 106-108 channel is a 2×1 . . . 2 MIMO broadcast channel, whose capacity is achieved by dirty-paper coding, which is:

$$C_s^{(3)} = \frac{1}{3} \sum_{i=1}^{2} \log\left(1 + \frac{P_{ri}^s \gamma_u^2 |h_i^H v_i|^2}{\sigma^2 + \sum_{j=1}^{2} P_{rj}^s \gamma_u^2 |h_j^H v_j|^2}\right)$$

where the beamforming vector $v_i$ is determined by Minimum Mean Square Error (MMSE) criterion.

To sum up, the system sum capacity in a TDD frame is thus given by:

$$C = \min(C_x^{(1)} + C_x^{(2)}, C_x^{(3)}) + \min(C_s^{(1)} + C_s^{(2)}, C_s^{(3)}).$$

Figure 4:
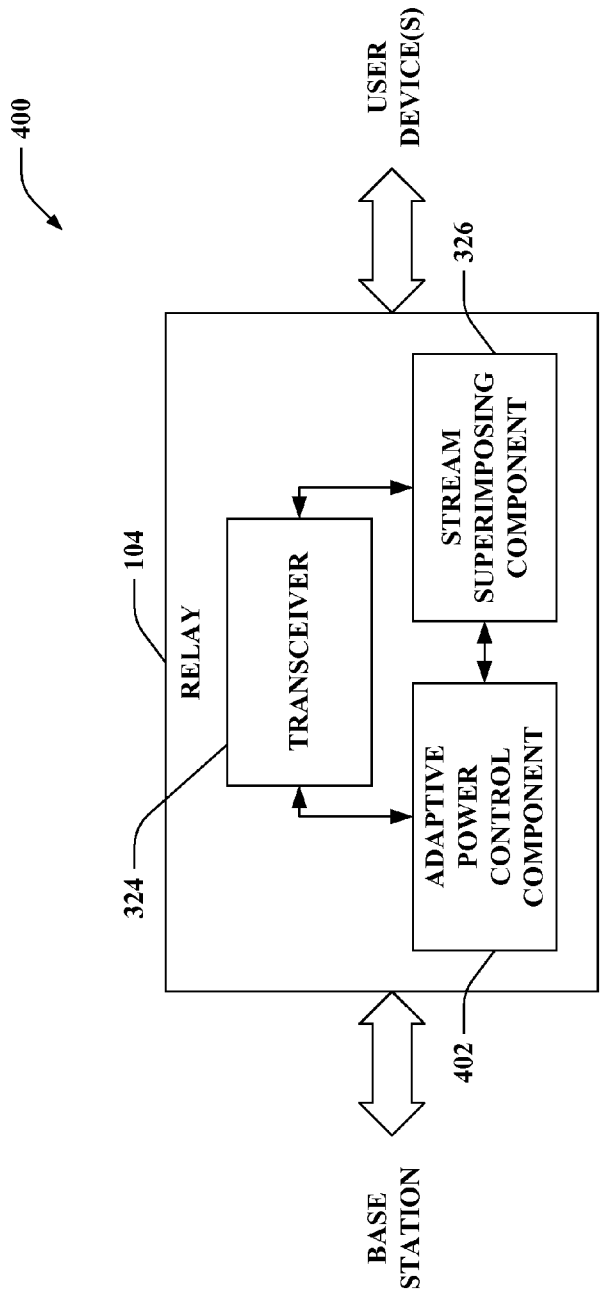
FIG. 4 is an illustration of an example system that employs adaptive relay power allocation in a wireless communication environment.

Turning to FIG. 4, illustrated is a system 400 that employs adaptive relay power allocation in a wireless communication environment. The system 400 includes the relay 104 that decodes and forwards data stream(s) from base station(s) to user device(s) and data stream(s) from user device(s) to base station(s). The relay 104 includes the transceiver 324 and the stream superimposing component 326 as described herein. Further, the relay 104 includes an adaptive power control component 402 that can increase system capacity by adaptively allocating relay power to the two channels: namely, the relay to base station channel and the relay to user device channel.

In a third time slot (e.g., the time slot 3 206 of FIG. 2), the system capacity can be increased by adaptively allocating relay power to the two channels by utilizing the adaptive power control component 402. The optimization problem can be written as:

$$\max_{P_{r1}^x, P_{r2}^x, P_{r1}^s, P_{r2}^s} \left(\min(C_x^{(1)} + C_x^{(2)}, C_x^{(3)}) + \min(C_s^{(1)} + C_s^{(2)}, C_s^{(3)})\right); \quad (1)$$

$$\text{s.t. } P_{r1}^x + P_{r2}^x + P_{r1}^s + P_{r2}^s \leq P_r,$$

which can be difficult to solve directly. However, by uplink and downlink duality, (1) can be formulated into a convex optimization problem. The idea is: the uplink and the downlink achieve substantially similar sum capacity with substantially similar power, which means the part $C_s^{(3)}$ in (1) can be replaced by a dual uplink part without affecting the results of $P_{r1}^x$ and $P_{r2}^x$. So the optimization problem (1) can be reformulated as:

$$\max_{P_{r1}^x, P_{r2}^x, q_{r1}^s, q_{r2}^s} \log \det\left(I + \frac{q_{r1}^s}{\sigma^2} \gamma_u^2 h_1 h_1^H + \frac{q_{r2}^s}{\sigma^2} \gamma_u^2 h_2 h_2^H\right) + \quad (2)$$

$$\sum_{i=1}^{2} \log\left(1 + \frac{P_{ri}^x}{\sigma^2} \gamma^2 \lambda_i^2\right);$$

$$\text{s.t. } \sum_{i=1}^{2} \log\left(1 + \frac{P_{ri}^x}{\sigma^2}\gamma^2\lambda_i^2\right) \le C_x^{(1)} + C_x^{(2)}; \quad (3)$$

$$\log \det\left(I + \frac{q_{r1}^s}{\sigma^2}\gamma_u^2 h_1 h_1^H + \frac{q_{r2}^s}{\sigma^2}\gamma_u^2 h_2 h_2^H\right) \le C_s^{(1)} + C_s^{(2)}; \quad (4)$$

$$P_{r1}^x + P_{r2}^x + q_{r1}^s + q_{r2}^s \le P_r \quad (5)$$

where $q_{r1}^s$ and $q_{r2}^s$ are the power allocated to user device 1 and user device 2 in the dual uplink channels and log det $$\left(I + \frac{q_{r1}^s}{\sigma^2}\gamma_u^2 h_1 h_1^H + \frac{q_{r2}^s}{\sigma^2}\gamma_u^2 h_2 h_2^H\right)$$

is the corresponding uplink capacity. Although $q_{r1}^s$ and $q_{r2}^s$ are not the same as $P_{r1}^x$ and $P_{r2}^x$, they can play the role of $P_{r1}^x$ and $P_{r2}^x$ in solving the optimization problem and $P_{r1}^x$ and $P_{r2}^x$, can be obtained by uplink and downlink duality after getting $q_{r1}^s$ and $q_{r2}^s$.

Thus, the standard convex optimization problem (2) has been obtained. However, the exact analytical solutions can still be too complex. Instead, in the following, an algorithm is developed to approach the optimal solution numerically.

Step 1: Solve the convex optimization problem (2) with only the power constraint (5).
Step 2: Check if the solutions satisfy the constraint (3). If not, then get $P_{r1}^x$ and $P_{r2}^x$ by solving the following problem:

$$\min P_{r1}^x + P_{r2}^x$$
$$\text{s.t. } \sum_{i=1}^{2} \log\left(1 + \frac{P_{ri}^x}{\sigma^2}\gamma^2\lambda_i^2\right) = C_x^{(1)} + C_x^{(2)}.$$

Then, if $q_{r1}^s$ and $q_{r2}^s$ have been fixed by the previous step, go to Step 4. Otherwise, fix $P_{r1}^x$ and $P_{r2}^x$ and solve (2) again with only power constraint (5).
Step 3: Check if the solutions satisfy the constraint (4). If not, then get $q_{r1}^s$ and $q_{r2}^s$ by solving the following problem:

$$\min q_{r1}^x + q_{r2}^x$$
$$\text{s.t. } \log \det\left(I + \frac{q_{r1}^s}{\sigma^2}\gamma_u^2 h_1 h_1^H + \frac{q_{r2}^s}{\sigma^2}\gamma_u^2 h_2 h_2^H\right) = C_S^{(1)} + C_S^{(2)}.$$

Then, if $P_{r1}^x$ and $P_{r2}^x$ have been fixed by the previous step, go to Step 4. Otherwise, fix $q_{r1}^s$ and $q_{r2}^s$ and solve (2) again with only power constraint (5) (go back to Step 2).
Step 4: With $P_{r1}^s + P_{r2}^s = q_{r1}^s + q_{r2}^s$, calculate $P_{r1}^x$ and $P_{r2}^x$ by the uplink and downlink duality.

Figure 5:
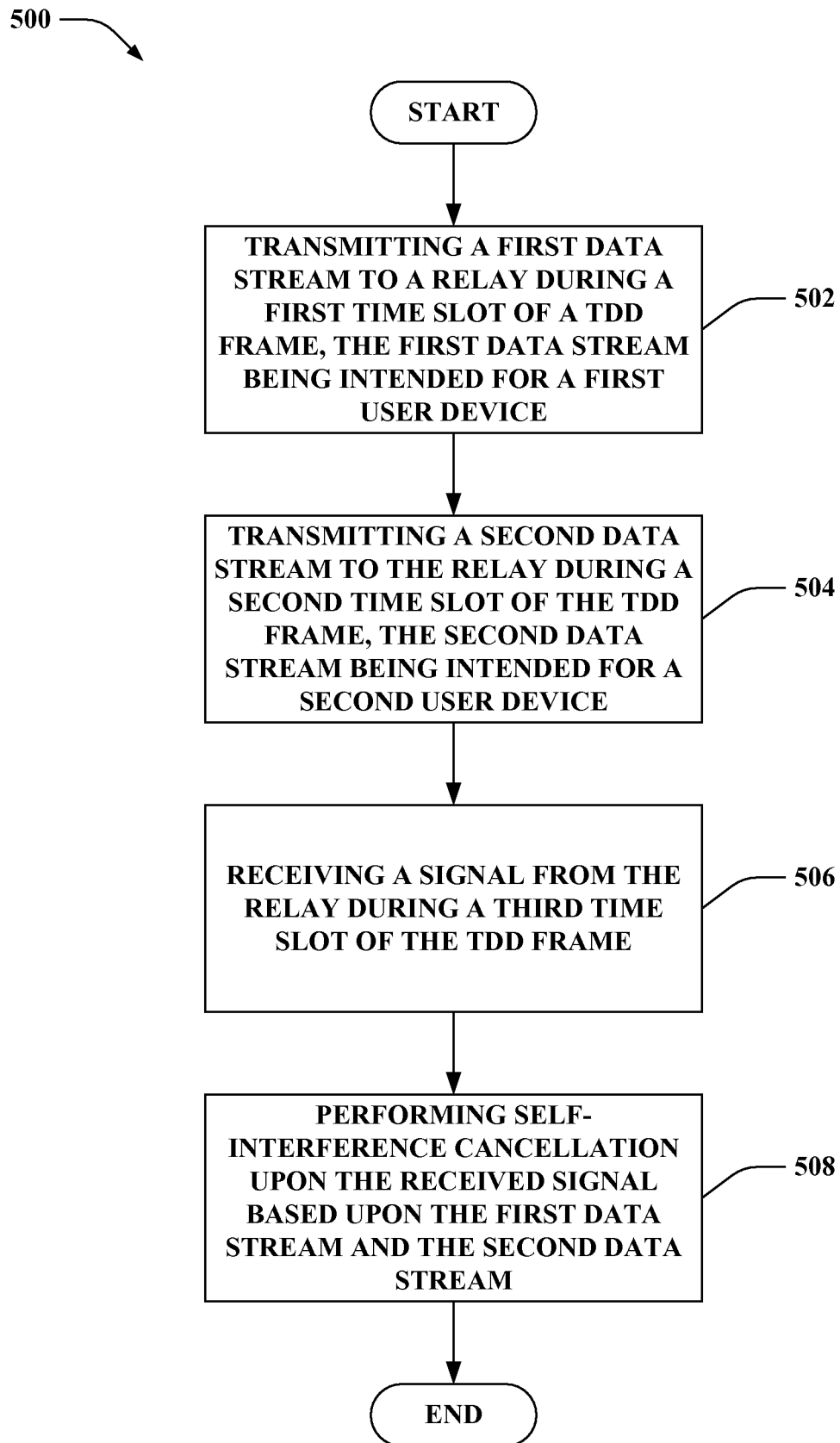
FIG. 5 is an illustration of an example methodology for operating a base station utilizing a multi-user MIMO relay protocol with self-interference cancellation in a wireless communication environment.
Figure 6:
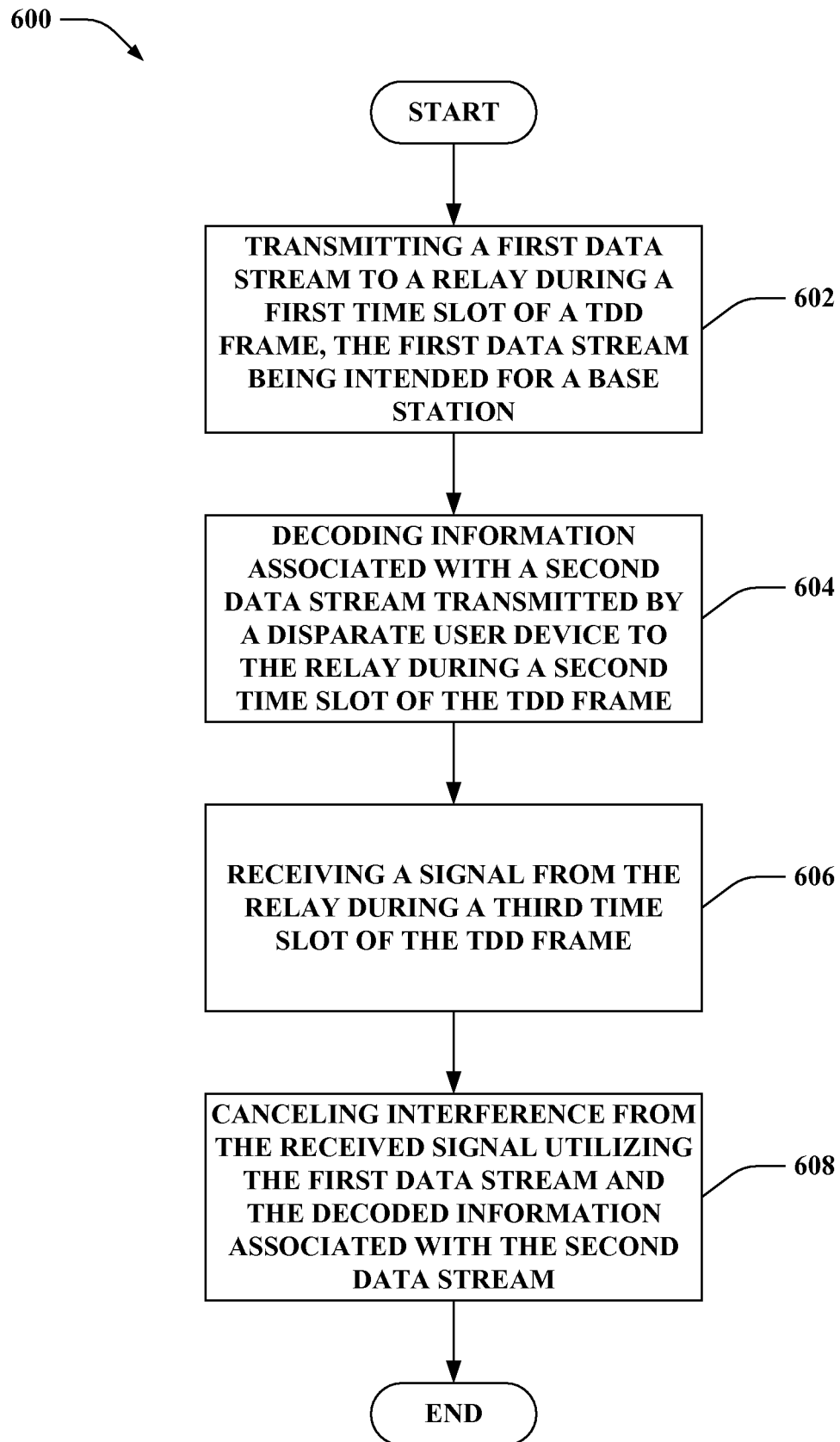
FIG. 6 is an illustration of an example methodology for operating a user device utilizing a multi-user MIMO relay protocol with self-interference cancellation in a wireless communication environment.
Figure 7:
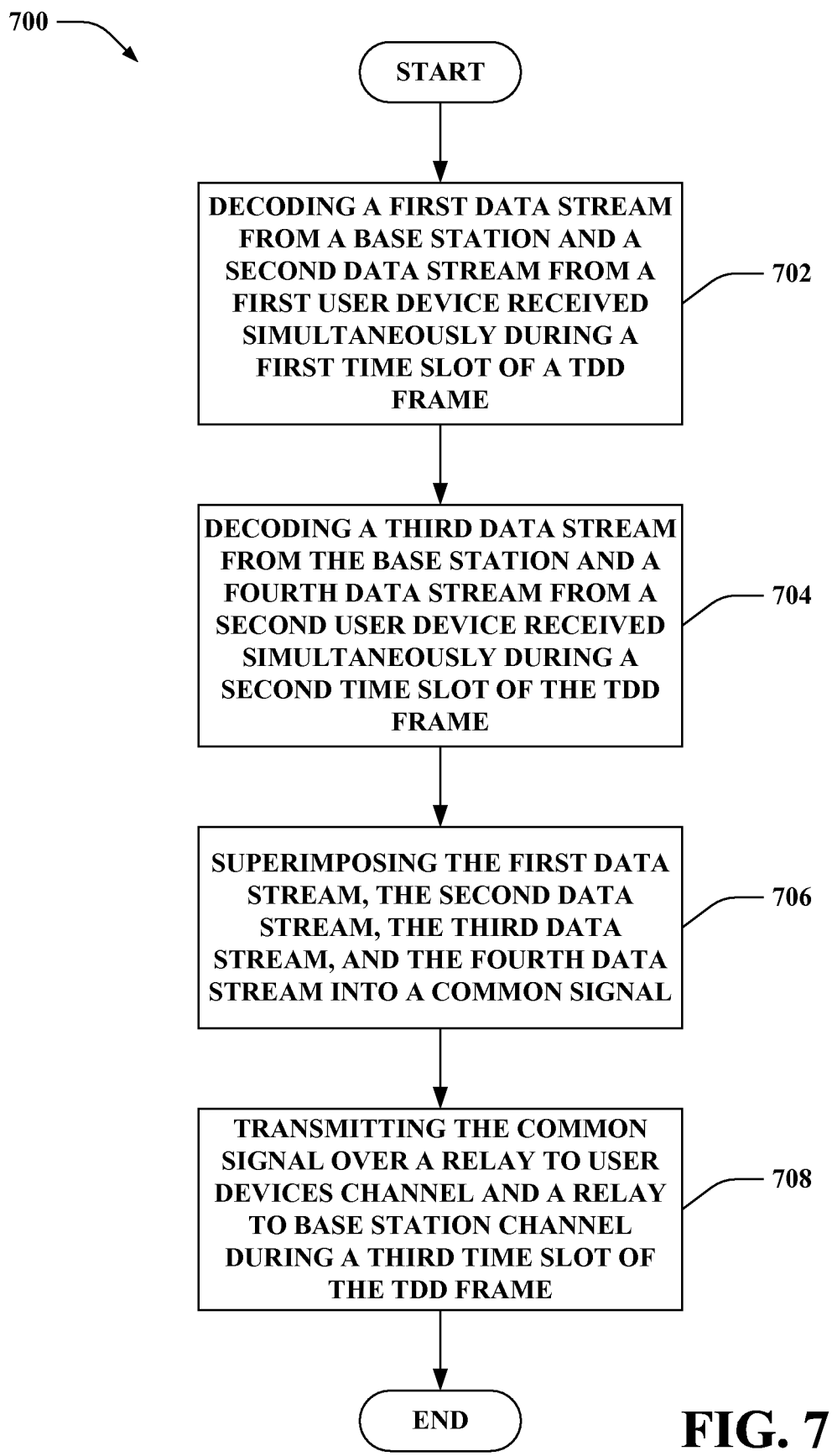
FIG. 7 is an illustration of an example methodology for operating a relay employing a multi-user MIMO relay protocol with self-interference cancellation in a wireless communication environment.
Figure 8:
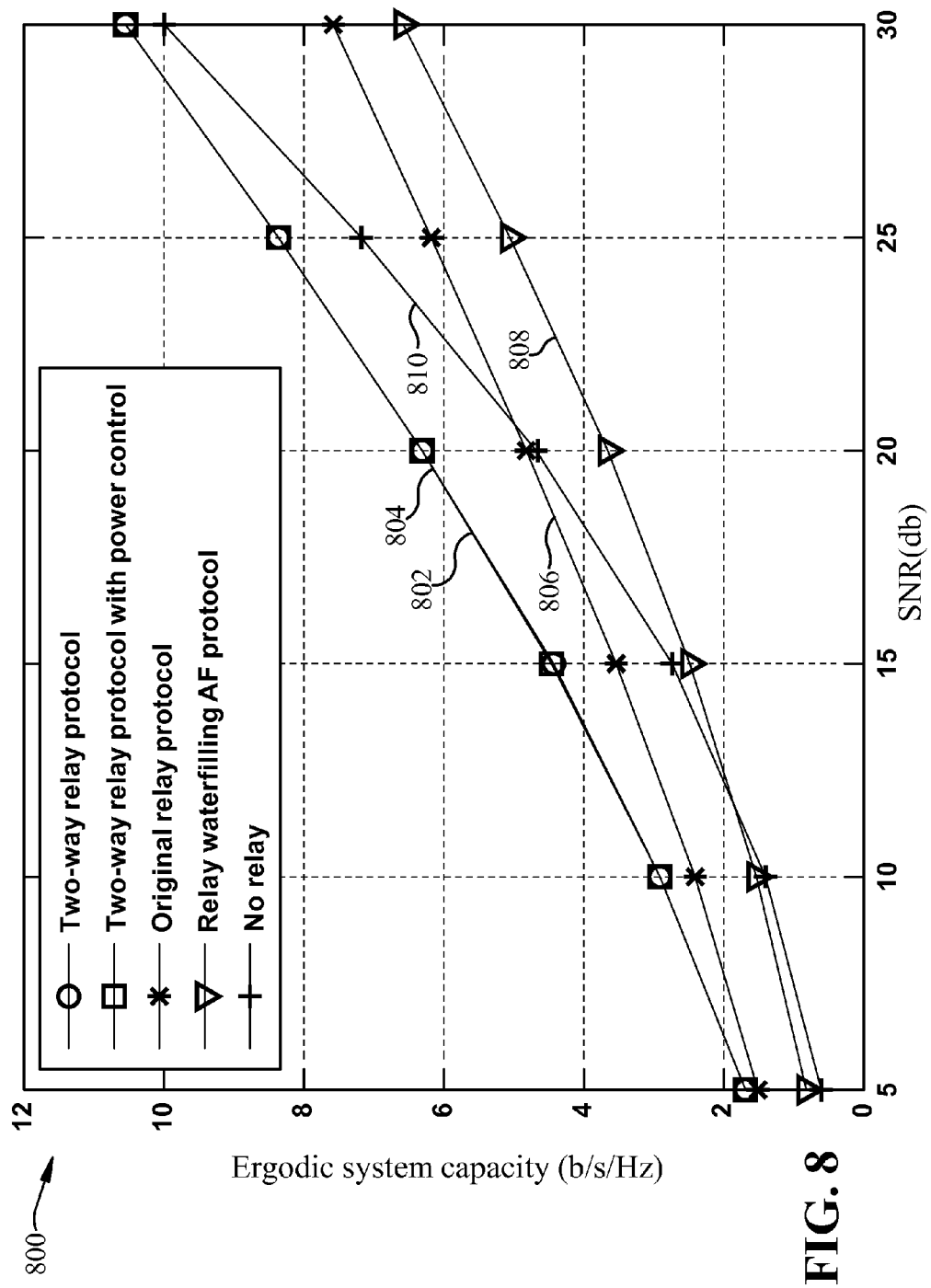
FIGS. 8, 9, 10, and 11 illustrate the relationship between ergodic system capacity and SNR under different conditions according to various embodiments.

Referring now to FIGS. 5-7, methodologies that can be implemented in accordance with various aspects described herein are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Referring now to FIG. 5, illustrated is an example methodology 500 for operating a base station utilizing a multi-user MIMO relay protocol with self-interference cancellation in a wireless communication environment. At 502, a first data stream can be transmitted to a relay during a first time slot of a TDD frame. The first data stream (e.g., $s_1$) can be intended for a first user device. However, communications with the first user device traverse through the relay; thus, the relay can decode and forward the first data stream to the first user device. The first data stream can be transmitted to the relay with a power $P_B = E[s_1^H s_1]$. Further, the first data stream (and/or information associated therewith) can be retained (e.g., in memory) at the transmitting base station. Also during the first time slot, the first user device can send a data stream $x_1$ to the relay for decoding and forwarding to the base station. At 504, a second data stream can be transmitted to the relay during a second time slot of the TDD frame. The second data stream (e.g., $s_2$) can be intended for a second user device. Similar to communications with the first user device, any communication with the second user device can traverse through the relay such that the relay can decode and forward the communication (e.g., the second data stream) to the second user device. Moreover, the second data stream can be transmitted to the relay with a power $P_B = E[s_2^H s_2]$. Further, the second data stream (and/or information associated therewith) can be retained (e.g., in memory) at the transmitting base station. Additionally, during the second time slot, the second user device can send a data stream $x_2$ to the relay for decoding and forwarding to the base station.

At 506, a signal from the relay can be received during a third time slot of the TDD frame. The signal can include data streams sent by the base station to the user devices as well as data stream(s) intended for the base station (e.g., data streams $x_1$ and $x_2$). The signal can also be transmitted simultaneously to the first and second user devices. At 508, self-interference cancellation can be performed upon the received signal based upon the first data stream and the second data stream. For instance, the retained first and second data streams (and/or information associated with such data streams) can be employed with self-interference cancellation to cancel the corresponding interference introduced by these data streams.

Turning to FIG. 6, illustrated is an example methodology 600 for operating a user device utilizing a multi-user MIMO relay protocol with self-interference cancellation in a wireless communication environment. At 602, a first data stream can be transmitted to a relay during a first time slot of a TDD frame. The first data stream (e.g., $x_1$) can be intended for a base station. However, communications with the base station traverse through the relay; thus, the relay can decode and forward the first data stream to the base station. The first data stream can be transmitted to the relay with a power $P_u=E[x_1^H x_1]$. Further, the first data stream (and/or information associated therewith) can be retained (e.g., in memory) at the transmitting user device. Also during the first time slot, the base station can send a data stream si to the relay for decoding and forwarding. At 604, information associated with a second data stream transmitted by a disparate user device to the relay can be decoded during a second time slot of the TDD frame. The second data stream (e.g., $x_2$) can be intended for the base station. According to another example, it is contemplated that the information associated with the second data stream transmitted by the disparate user device can be decoded during the first time slot while the first data stream can be transmitted to the relay during the second time slot.

At 606, a signal can be received from the relay during a third time slot of the TDD frame. The signal can include data streams sent by the user device and the disparate user device to the base station as well as data stream(s) intended for the user devices (e.g., data streams $s_1$ and $s_2$). The signal can also be transmitted simultaneously to the base station. At 608, interference can be cancelled from the received signal utilizing the first data stream and the decoded information associated with the second data stream. For instance, the retained first data stream and the decoded second data stream (and/or information associated with such data streams) can be employed for interference cancellation; thus, interference introduced by these data streams can be cancelled from the received signal.

With reference to FIG. 7, illustrated is an example methodology 700 of employing a multi-user MIMO relay protocol with self-interference cancellation for operating a relay in a wireless communication environment. At 702, a first data stream from a base station (e.g., $s_1$) and a second data stream (e.g., $x_1$) from a first user device received simultaneously during a first time slot of a TDD frame can be decoded. For instance, successive interference cancellation can be employed upon the data streams concurrently obtained during the first time slot. At 704, a third data stream (e.g., $s_2$) from the base station and a fourth data stream (e.g., $x_2$) from a second user device received simultaneously during a second time slot of the TDD frame can be decoded. Further, successive interference cancellation can be utilized upon the data streams concurrently obtained during the second time slot. At 706, the first data stream, the second data stream, the third data stream, and the fourth data stream can be superimposed into a common signal. At 708, the common signal can be transmitted over a relay to user devices channel and a relay to base station channel during a third time slot of the TDD frame. Further, system capacity can be increased by adaptively allocating relay power to the two channels: the relay to user device channel and the relay to base station channel.

The efficacy of the above described embodiments can be verified by simulated results, as presented in non-limiting fashion in FIGS. 8-11. The capacity gain of the two-way relay protocol can be compared to the original protocol and the relay waterfilling AF protocol in various system scenarios. Additionally, the capacity gain of the two-way relay protocol can be compared to the capacity of the protocol in which no relay is used.

In each scenario described herein, the base station, the relay and the user devices can be assumed to be aligned. The distance between the base station and the user devices, $d+d_u$, can be the same throughout the examples, although the ratio between d and $d_u$ can be altered. The power of the users can also be kept as a constant for the scenarios, while the power of the base station and the relay can be either equal to or four times that of the user devices. Moreover, the capacity curves can be generated by averaging over more than 100,000 channel realizations.

Graphs 800, 900, 1000, and 1100 of FIGS. 8, 9, 10, and 11, respectively, show the relationship between ergodic system capacity and SNR under different conditions. Graph 800 of FIG. 8 relates to conditions where $d=d_u$ and $P_B=P_r=P_u$. In graph 800, curve 802 illustrates capacity when employing the two-way relay protocol, curve 804 depicts capacity when using the two-way relay protocol with power control, curve 806 illustrates capacity resulting from use of the original relay protocol, curve 808 illustrates capacity when employing the relay waterfilling AF protocol, and curve 810 depicts capacity when no relay is used. As shown, the proposed schemes provide capacity gain over conventional techniques.

Figure 9:
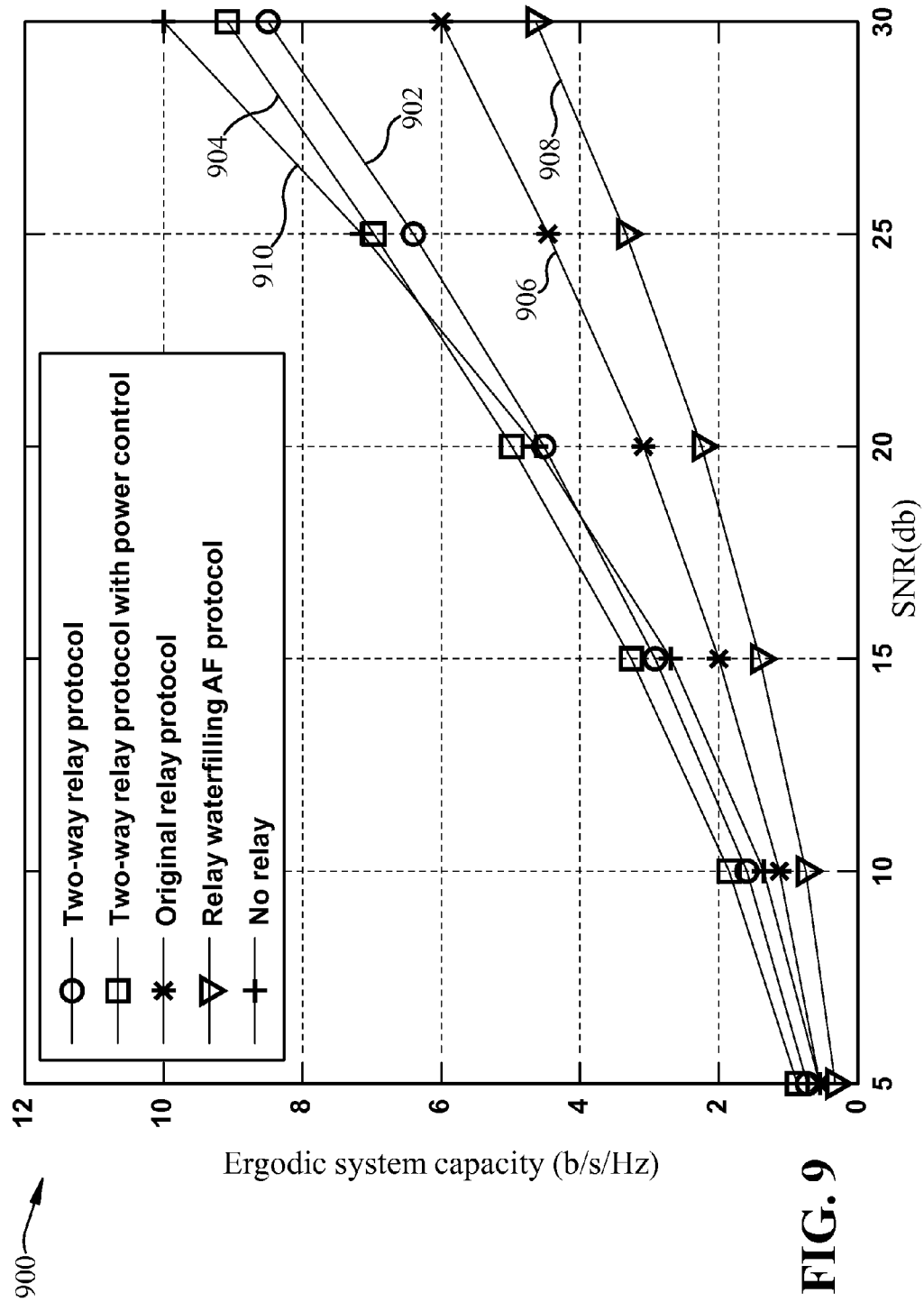

Graph 900 of FIG. 9 depicts results pertaining to the following conditions: $d=5 \times d_u$ and $P_B=P_r=P_u$. In graph 900, curve 902 depicts capacity when using the two-way relay protocol, curve 904 illustrates capacity when employing the two-way relay protocol with power control, curve 906 depicts capacity when using the original relay protocol, curve 908 illustrates capacity when utilizing the relay waterfilling AF protocol, and curve 910 illustrates capacity when no relay is employed. As illustrated, the proposed two-way relay protocol can provide capacity gain over conventional techniques at lower SNRs; however, the no relay protocol capacity curve 910 can have a larger slope at higher SNRs.

Figure 10:
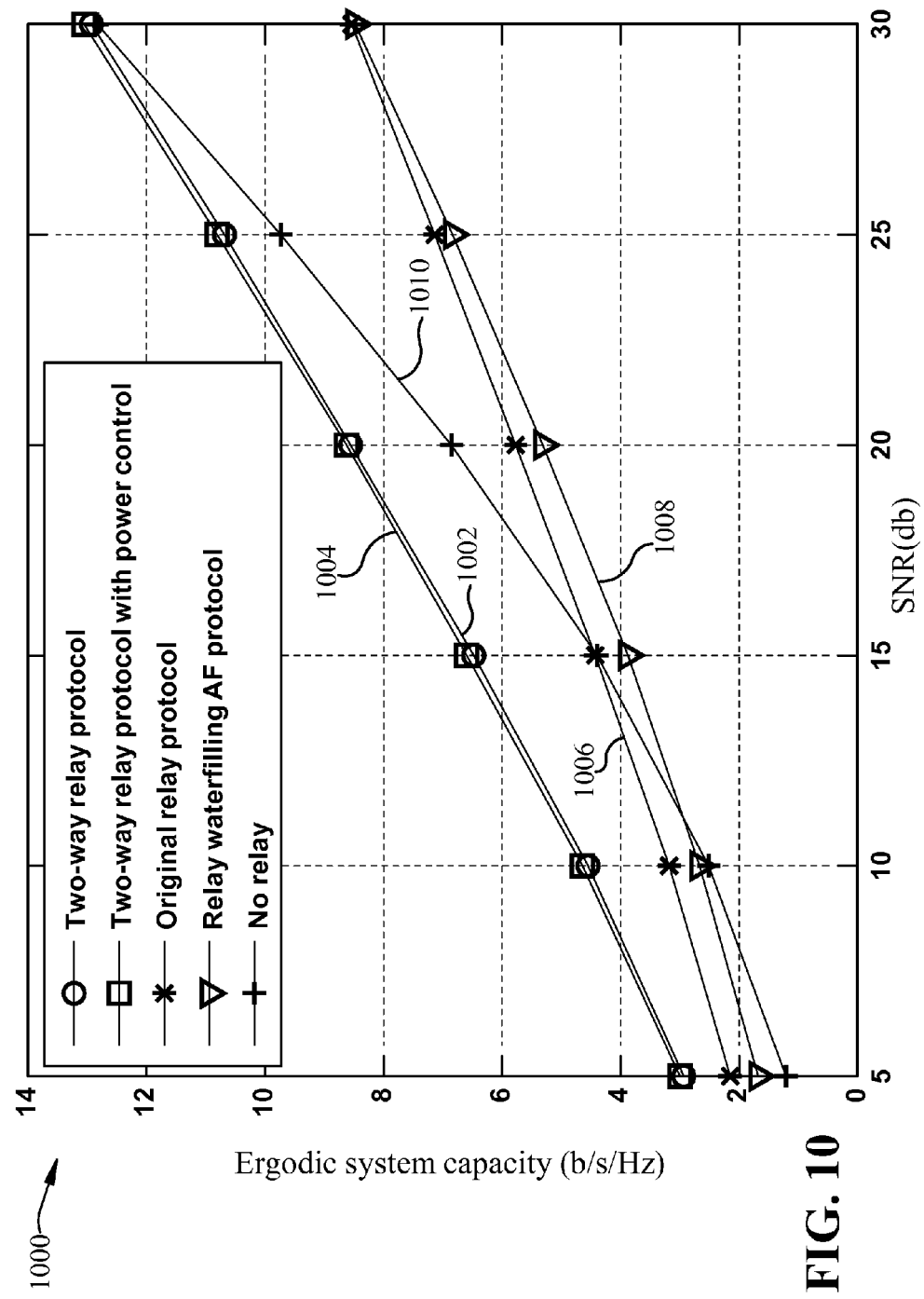

Graph 1000 of FIG. 10 illustrates results from the following conditions: $d=d_u$ and $P_B=P_r=4 \times P_u$. In graph 1000, curve 1002 illustrates capacity when using the two-way relay protocol, curve 1004 illustrates capacity when using the two-way relay protocol with power control, curve 1006 depicts capacity when employing the original relay protocol, curve 1008 illustrates capacity when using the relay waterfilling AF protocol, and curve 1010 illustrates capacity when the no relay protocol is employed. The graph 1000 illustrates that the proposed two-way relay protocol and two-way relay protocol with power control provide capacity gain over conventional techniques.

Figure 11:
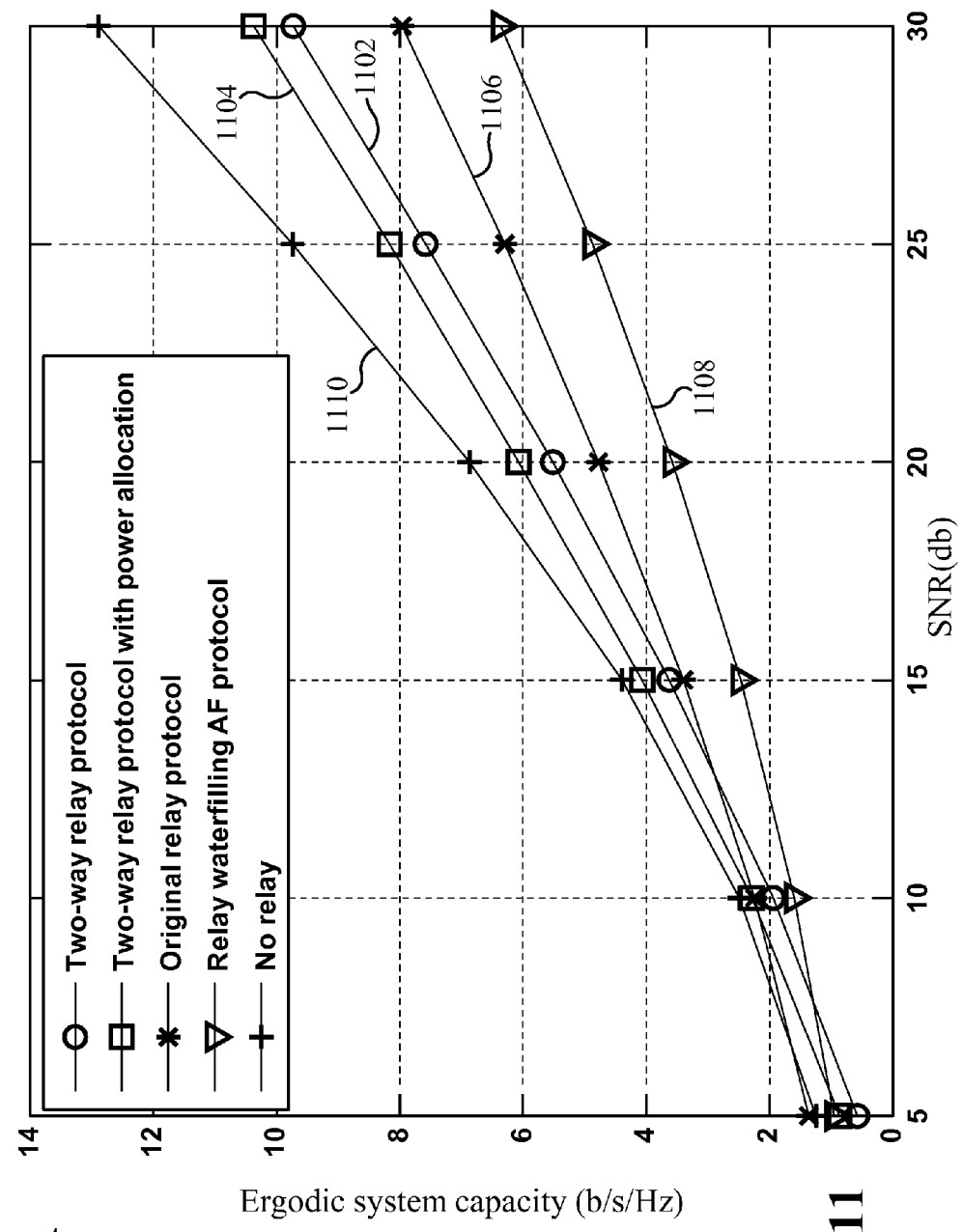

Graph 1100 of FIG. 11 depicts results related to the following conditions: $d=5 \times d_u$ and $P_B=P_r=4 \times P_u$. In graph 1100, curve 1102 depicts capacity when employing the two-way relay protocol, curve 1104 illustrates capacity when utilizing the two-way relay protocol with power allocation (e.g., power control), curve 1106 illustrates capacity when using the original relay protocol, curve 1108 depicts capacity when the relay water filling AF protocol is employed, and curve 1110 illustrates capacity when the no relay protocol is used.

As shown in FIGS. 8-11, the two-way relay protocol can achieve at least 30% capacity gain over the original relay protocol and the relay waterfilling protocol in the various scenarios. The power control algorithm can be more effective in scenarios where the capacity of the relay to user devices channel is much higher than the capacity of the relay to base station channel because it can adaptively allocate the power based on the channel conditions in these cases.

However, it can also be observed that the no relay protocol capacity curve has larger slope at higher SNRs than two-way relay protocols and may be superior to the relay protocols shown in FIG. 11, where $d=5 \times d_u$ and $P_B=P_r=4 \times P_u$. To explain this, the degree of freedom of the channel can be defined to be the dimension of the received signal. The no relay protocol achieves a highest degree of freedom among all the protocols because it does not allocate radio resources to the transmission between the relay and the user devices. Further, the role that the relay is playing can be to trade some degree of freedom of the channel for system power enhancement. As is known, the capacity increases logarithmically with power. Thus, the relay may not be helpful in systems where increasing the power cannot increase capacity, which can be observed in high SNR regions from FIGS. 8-11. In fact, the reason that the two-way relay protocol can surpass other relay protocols can be because it creates more degrees of freedom by performing self-interference cancellation. The results can suggest installing relays in systems which are power limited, where increasing system power can significantly increase system capacity; however, the claimed subject matter is not so limited.

Another reason that the no relay protocol can provide higher capacity than the relay protocols in FIG. 11 can be that the relay is much nearer to the user devices than the base station and the overall system capacity is restricted by the relay to base station channel. Accordingly, the results can also suggest selecting the relay approach if the relay is in the middle of the base station and the user devices. However, it is to be appreciated that the claimed subject matter is not so limited.

In brief sum, capacity loss due to the radio resource being occupied by the relay transmission can be a property that hinders development of relay assisted wireless networks. Thus, the two-way relay protocol that applies self-interference cancellation into a multi-user MIMO system described herein can address the foregoing. The capacity of the two-way relay protocol was analyzed and compared to other multi-user MIMO relay protocols by simulation. It can be observed that the two-way relay protocol can achieve more than 30% capacity gain than conventional protocols. Further, an adaptive power allocation algorithm can further enhance the capacity gain.

Figure 12:
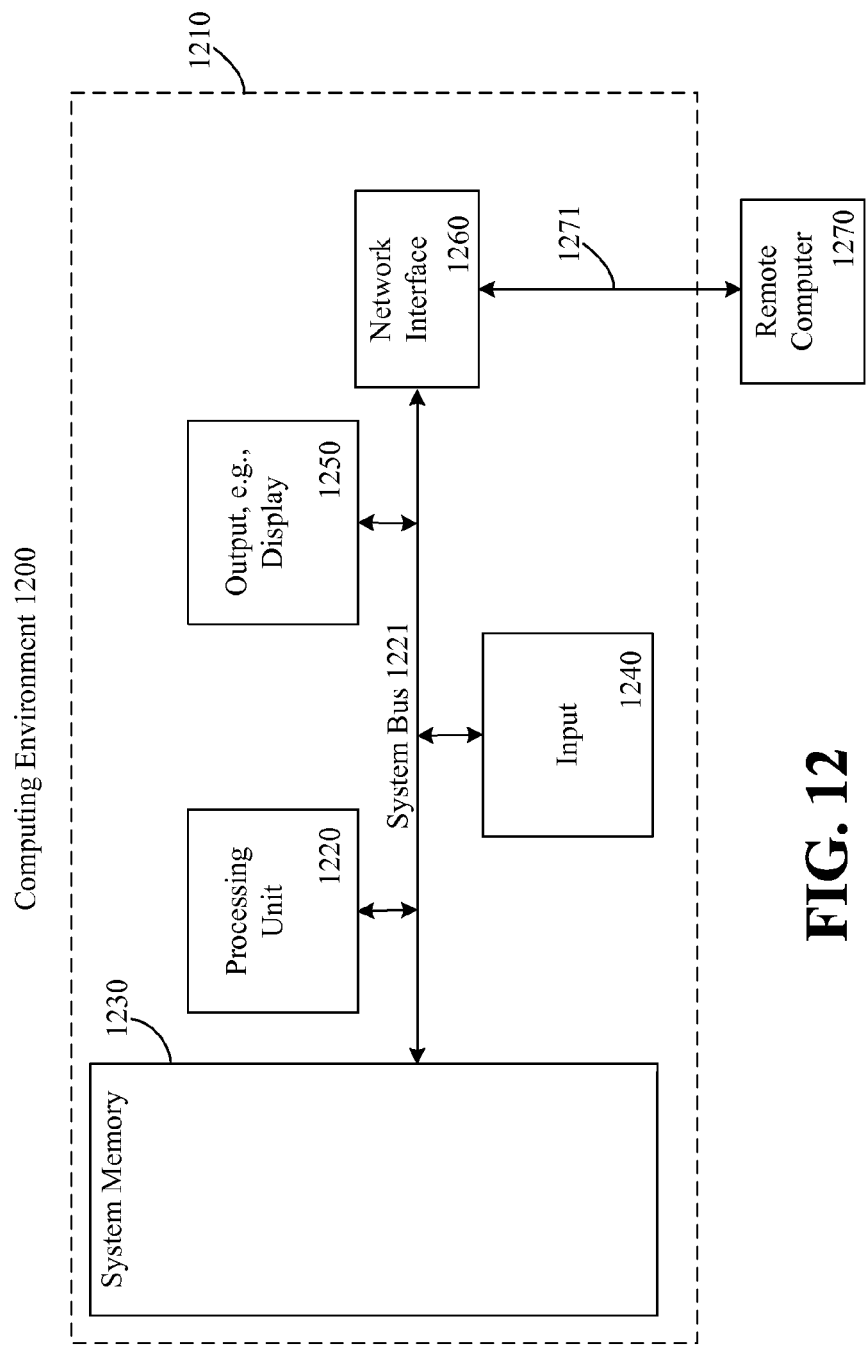
FIG. 12 is a block diagram of an example operating environment in which various aspects described herein can function.

Turning to FIG. 12, an exemplary non-limiting computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a communications system may be desirably configured. Accordingly, the below general purpose remote computer described below in FIG. 12 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer-executable instructions, such as program modules, being executed by one or more computers, such as clients, servers, mobile devices, or other devices. Those skilled in the art will appreciate that the claimed subject matter can also be practiced with other computer system configurations and protocols, where non-limiting implementation details are given.

FIG. 12 thus illustrates an example of a suitable computing system environment 1200 in which the claimed subject matter may be implemented, although as made clear above, the computing system environment 1200 is only one example of a suitable computing environment for a media device and is not intended to suggest any limitation as to the scope of use or functionality of the claimed subject matter. Further, the computing environment 1200 is not intended to suggest any dependency or requirement relating to the claimed subject matter and any one or combination of components illustrated in the example operating environment 1200.

With reference to FIG. 12, an example of a remote device for implementing various aspects described herein includes a general purpose computing device in the form of a computer 1210. Components of computer 1210 can include, but are not limited to, a processing unit 1220, a system memory 1230, and a system bus 1221 that couples various system components including the system memory to the processing unit 1220. The system bus 1221 can be any of several types of bus structures including a memory bus or memory controller, a peripheral bus, and a local bus using any of a variety of bus architectures.

Computer 1210 can include a variety of computer readable media. Computer readable media can be any available media that can be accessed by computer 1210. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media can embody computer readable instructions, data structures, program modules or other data in a modulated data signal such as a carrier wave or other transport mechanism and can include any suitable information delivery media.

The system memory 1230 can include computer storage media in the form of volatile and/or nonvolatile memory such as read only memory (ROM) and/or random access memory (RAM). A basic input/output system (BIOS), containing the basic routines that help to transfer information between elements within computer 1210, such as during start-up, can be stored in memory 1230. Memory 1230 can also contain data and/or program modules that are immediately accessible to and/or presently being operated on by processing unit 1220. By way of non-limiting example, memory 1230 can also include an operating system, application programs, other program modules, and program data.

The computer 1210 can also include other removable/non-removable, volatile/nonvolatile computer storage media. For example, computer 1210 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1221 through a non-removable memory interface such as an interface, and a magnetic disk drive or optical disk drive can be connected to the system bus 1221 by a removable memory interface, such as an interface.

A user can enter commands and information into the computer 1210 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1220 through user input 1240 and associated interface(s) that are coupled to the system bus 1221, but can be connected by other interface and bus structures, such as a parallel port, game port or a universal serial bus (USB). A graphics subsystem can also be connected to the system bus 1221. In addition, a monitor or other type of display device can be connected to the system bus 1221 via an interface, such as output interface 1250, which can in turn communicate with video memory. In addition to a monitor, computers can also include other peripheral output devices, such as speakers and/or a printer, which can also be connected through output interface 1250.

The computer 1210 can operate in a networked or distributed environment using logical connections to one or more other remote computers, such as remote computer 1270, which can in turn have media capabilities different from device 1210. The remote computer 1270 can be a personal computer, a server, a router, a network PC, a peer device or other common network node, and/or any other remote media consumption or transmission device, and can include any or all of the elements described above relative to the computer 1210. The logical connections depicted in FIG. 12 include a network 1271, such local area network (LAN) or a wide area network (WAN), but can also include other networks/buses. Such networking environments are commonplace in homes, offices, enterprise-wide computer networks, intranets and the Internet.

When used in a LAN networking environment, the computer 1210 is connected to the LAN 1271 through a network interface or adapter. When used in a WAN networking environment, the computer 1210 can include a communications component, such as a modem, or other means for establishing communications over the WAN, such as the Internet. A communications component, such as a modem, which can be internal or external, can be connected to the system bus 1221 via the user input interface at input 1240 and/or other appropriate mechanism. In a networked environment, program modules depicted relative to the computer 1210, or portions thereof, can be stored in a remote memory storage device. It should be appreciated that the network connections shown and described are exemplary and other means of establishing a communications link between the computers can be used.

Figure 13:
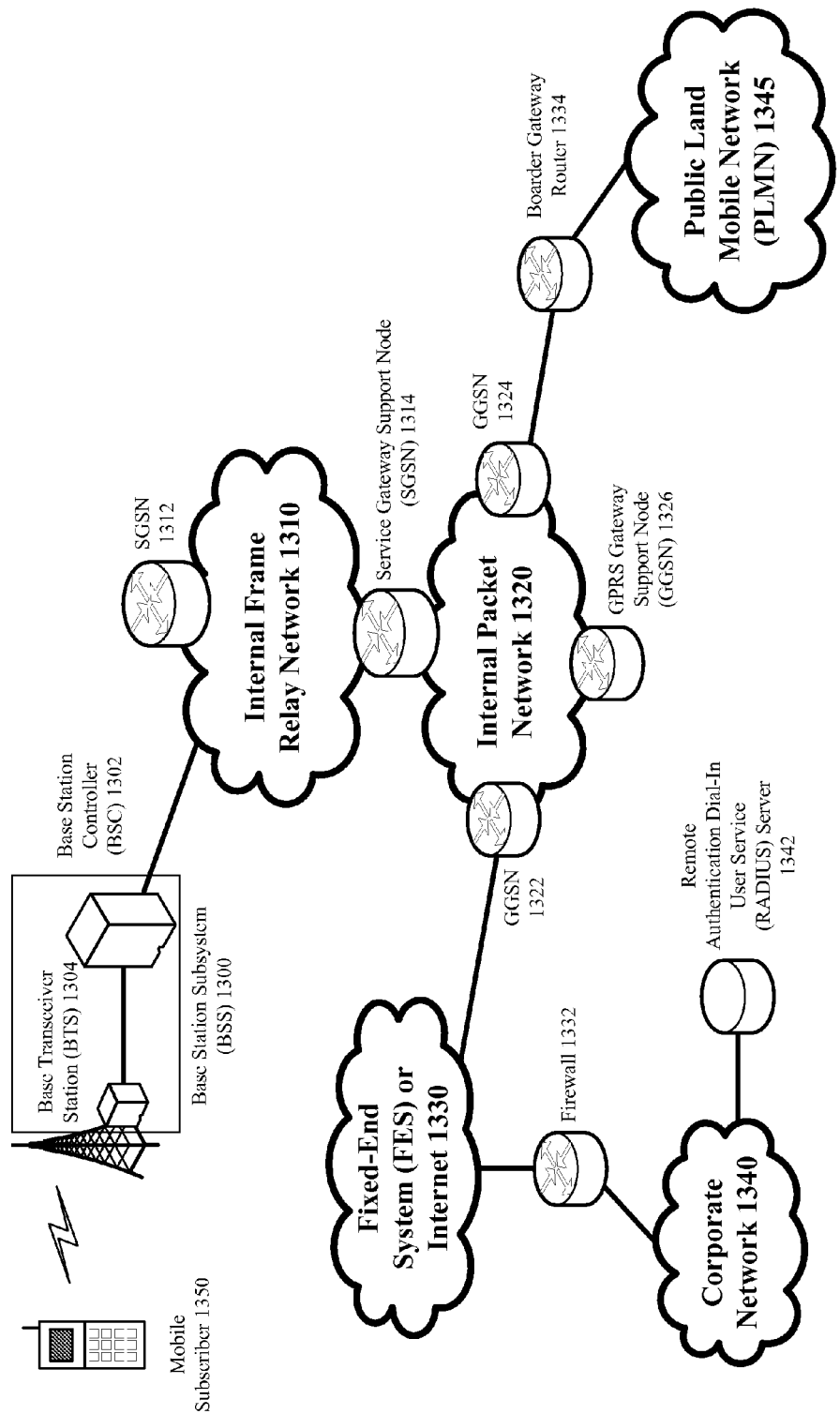
FIG. 13 illustrates an example wireless communication network in which various aspects described herein can be utilized.

Turning now to FIG. 13, an overview of a network environment in which the claimed subject matter can be implemented is illustrated. The above-described systems and methodologies for timing synchronization may be applied to any wireless communication network; however, the following description sets forth an exemplary, non-limiting operating environment for said systems and methodologies. The below-described operating environment should be considered non-exhaustive, and thus the below-described network architecture is merely an example of a network architecture into which the claimed subject matter can be incorporated. It is to be appreciated that the claimed subject matter can be incorporated into any now existing or future alternative architectures for communication networks as well.

FIG. 13 illustrates various aspects of the global system for mobile communication (GSM). GSM is one of the most widely utilized wireless access systems in today's fast growing communications systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the timing synchronization techniques described herein may be applied independently of the method of data transport, and does not depend on any particular network architecture or underlying protocols.

FIG. 13 depicts an overall block diagram of an exemplary packet-based mobile cellular network environment, such as a GPRS network, in which the claimed subject matter can be practiced. Such an environment can include a plurality of Base Station Subsystems (BSS) 1300 (only one is shown), each of which can comprise a Base Station Controller (BSC) 1302 serving one or more Base Transceiver Stations (BTS) such as BTS 1304. BTS 1304 can serve as an access point where mobile subscriber devices 1350 become connected to the wireless network. In establishing a connection between a mobile subscriber device 1350 and a BTS 1304, one or more timing synchronization techniques as described supra can be utilized.

In one example, packet traffic originating from mobile subscriber 1350 is transported over the air interface to a BTS 1304, and from the BTS 1304 to the BSC 1302. Base station subsystems, such as BSS 1300, are a part of internal frame relay network 1310 that can include Service GPRS Support Nodes ("SGSN") such as SGSN 1312 and 1314. Each SGSN is in turn connected to an internal packet network 1320 through which a SGSN 1312, 1314, etc., can route data packets to and from a plurality of gateway GPRS support nodes (GGSN) 1322, 1324, 1326, etc. As illustrated, SGSN 1314 and GGSNs 1322, 1324, and 1326 are part of internal packet network 1320. Gateway GPRS serving nodes 1322, 1324 and 1326 can provide an interface to external Internet Protocol ("IP") networks such as Public Land Mobile Network ("PLMN") 1345, corporate intranets 1340, or Fixed-End System ("FES") or the public Internet 1330. As illustrated, subscriber corporate network 1340 can be connected to GGSN 1322 via firewall 1332; and PLMN 1345 can be connected to GGSN 1324 via boarder gateway router 1334. The Remote Authentication Dial-In User Service ("RADIUS") server 1342 may also be used for caller authentication when a user of a mobile subscriber device 1350 calls corporate network 1340.

Generally, there can be four different cell sizes in a GSM network—macro, micro, pico, and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

What is claimed is:

1. A system, comprising:
    a relay configured to receive data streams including a first data stream and a second data stream from a base station via a first channel, decode and process the data streams to yield a signal, transmit the signal via the first channel to the base station and transmit the signal via a second channel to a first device and via a third channel to a second device;
    wherein the relay is further configured to direct the first data stream and the second data stream respectively to the first device and the second device;
    wherein the relay is further configured to receive a third data stream from the first device and direct the third data stream to the base station; and
    wherein the relay is further configured to receive a fourth data stream from the second device and direct the fourth data stream to the base station,
    wherein the relay is further configured to receive the first data stream from the base station and the third data stream from the first device during a first time slot of a Time Division Duplex (TDD) frame, and receive the second data stream from the base station and the fourth data stream from the second device during a second time slot of the TDD frame.

2. The system of claim 1, further comprising an interference cancellation component configured to mitigate interference from the signal introduced by the first data stream and the second data stream based on knowledge of the first data stream and the second data stream and knowledge of channel state information of the first channel and the second channel.

3. The system of claim 1, wherein the first device and the second device further comprise a respective channel monitoring component configured to listen to and decode the fourth data stream of the second device and the third data stream of the first device, respectively.

4. The system of claim 3, wherein the first device and the second device further comprise a respective interference monitoring component configured to mitigate interference from the signal based upon knowledge of the third data stream and fourth data stream, respectively, and based on knowledge of the fourth data stream and the third data stream, respectively decoded by the respective channel monitoring component.

5. The system of claim 4, wherein the respective channel monitoring component of the first device is further configured to listen to and decode the fourth data stream of the second device and the respective interference monitoring component of the first device is configured to mitigate the interference from the signal based upon knowledge of the third data stream and the fourth data stream as decoded and knowledge of channel state information of the second channel and the third channel.

6. The system of claim 4, wherein the respective channel monitoring component of the second device is further configured to listen to and decode the third data stream of the first device and the respective interference monitoring component of the second device is configured to mitigate the interference from the signal based upon knowledge of the fourth data stream and the third data stream as decoded and knowledge of the channel state information of the second channel and the third channel.

7. The system of claim 1, wherein the relay is further configured to decode and forward the first data stream and the second data stream to the base station as part of the signal sent during a third time slot of a Time Division Duplex (TDD) frame.

8. The system of claim 1, wherein the relay is configured to transmit the signal to the base station, the first device, and the second device during a third time slot of the TDD frame.

9. The system of claim 1, wherein the relay is further configured to decode the first data stream and the third data stream during the first time slot utilizing first successive interference cancellation and decode the second data stream and the fourth data stream during the second time slot utilizing second successive interference cancellation.

10. The system of claim 1, wherein the relay is configured to concurrently or substantially concurrently receive the first data stream and the third data stream, and concurrently or substantially concurrently receive the second data stream and the fourth data stream.

11. The system of claim 1, wherein the relay is configured to transmit the signal over the first channel at a first power level and the second and third channels at a second power level, the first power level and the second power level being pre-configured.

12. The system of claim 1, wherein the relay further comprises an adaptive power control component configured to adaptively allocate power to the first channel, the second channel and the third channel for transmission of the signal.

13. The system of claim 1, wherein the relay is configured to receive the first data stream and the second data stream from the base station, receive the third data stream from the first device, and receive the fourth data stream from the second device from respective data stream generation components of the base station, the first device and the second device.

14. A method, comprising:
decoding a first data stream from a base station and a second data stream from a first device received during a first time slot of a Time Division Duplex (TDD) frame;
decoding a third data stream from the base station and a fourth data stream from a second device received during a second time slot of the TDD frame;
processing the first data stream, the second data stream, the third data stream, and the fourth data stream into a common signal; and
relaying the common signal to the first device and the second device via a device channel and relaying the common signal to a base station via a base station channel during a third time slot of the TDD frame.

15. The method of claim 14, further comprising:
employing first successive interference cancellation to decode the first data stream and the second data stream received during the first time slot; and
employing second successive interference cancellation to decode the third data stream and the fourth data stream received during the second time slot.

16. The method of claim 14, wherein the first data stream is directed to the first device, the second data stream is directed to the base station, the third data stream is directed to the second device, and the fourth data stream is directed to the base station.

17. The method of claim 14, further comprising adaptively allocating power to a first relay performing the relaying to the device channel and a second relay performing the relaying to the base station channel for transmission of the common signal.

18. The method of claim 14, further comprising transmitting the common signal utilizing fixed power levels for performing the relaying to the device channel and performing the relaying to the base station channel.

19. A system, comprising:
means for receiving a first data stream at a relay during a first time slot of a Time Division Duplex (TDD) frame, the first data stream being directed to a base station;
first means for decoding information associated with the first data stream and a second data stream received from a first device at the relay during a second time slot of the TDD frame;
means for generating a signal based on the first data stream, the second data stream, and a third data stream received from the base station;
second means for decoding the signal, the third data stream, and a fourth data stream received from a second device, at the relay during a third time slot of the TDD frame, wherein the first data stream, the second data stream, the third data stream, and the fourth data stream are processed into a common signal for relaying to at least one of the first device, the second device, or the base station; and
means for cancelling interference from the signal decoded by the second means for decoding utilizing at least the first data stream and the information associated with the second data stream decoded by the first means for decoding.

20. The system of claim 19, further comprising:
a means for decoding and forwarding the first data stream and the second data stream to the base station as part of sending the signal during the third time slot of the TDD frame.

21. The system of claim 19, further comprising:
means for retaining stream information associated with the first data stream in memory; and
means for retrieving the stream information associated with the first data stream for interference cancellation.

22. A device, comprising:
a transceiver configured to receive a signal from a relay, the signal comprising information based on a first data stream and a second data stream of a Time Division Duplex (TDD) frame, wherein the signal is received in a third time slot of the TDD frame, the first data stream is having been transmitted by the device to the relay during a first time slot of the TDD frame, and the second data stream having been transmitted by the base station to the relay during the first time slot of the TDD frame;
a channel monitoring component configured to monitor and decode a third data stream received from the relay, the third data stream having been sent by another device to the relay during a second time slot of the TDD frame to obtain decoded information; and
an interference cancellation component configured to employ the signal and the decoded information to cancel out interference from the received signal during the third time slot.

23. The device of claim 22, wherein the interference includes interference introduced in the third time slot by the first and third data streams.

24. The device of claim 22, wherein the channel monitoring component is configured to apply self-interference mitigation on the signal received from the relay.

25. A method, comprising:
receiving, from a first device a first data stream of a Time Division Duplex (TDD) frame during a first time slot of the TDD frame via a first channel;
receiving, from a base station, a second data stream during the first time slot via a second channel;
receiving, from a second device, a third data stream during a second time slot of the TDD frame via a third channel;

receiving, from the base station, a fourth data stream during the second time slot via the second channel;

applying successive noise cancellation to the first and second data streams during the first time slot and the third and fourth data streams during the second time slot;

adaptively allocating relay power levels associated with transmission over the first, second and third channels, respectively, during a third time slot of the TDD frame;

generating a signal based on the first, second, third, and fourth data streams; and transmitting the signal via the first, second, and third channels.

26. The method of claim 25, further comprising:

employing a first successive interference cancellation to decode the first data stream and the second data stream received during a first time slot of the TDD frame; and employing a second successive interference cancellation to decode the third data stream and the fourth data stream received during the second time slot of the TDD frame.

27. The device of claim 22, wherein the signal further comprises information based on the third data stream and a fourth data stream, and the fourth data stream is sent by the base station to the relay during the second time slot.

28. The device of claim 27, wherein the interference cancellation component is configured to employ the signal and the decoded information to cancel out the interference during the third time slot, wherein the interference is introduced to the third time slot by the first, second, third and fourth data streams.

29. A method comprising:

transmitting, by a device including a processor, a first data stream in a first time slot of a Time Division Duplex (TDD) frame to a relay;

monitoring and decoding, by the device, a second data stream previously sent by another device to the relay during a second time slot of the TDD frame to obtain decoded information;

receiving, by the device, from the relay during a third time slot of the TDD frame, a signal comprising information based on the first data stream and a third data stream, wherein the third data stream was previously sent by a base station to the relay during the first time slot of the TDD frame; and employing the signal and the decoded information to cancel out interference from the received signal during the third time slot, the interference having been introduced in the third time slot by the first, second, and third data streams.

30. The method of claim 29, further comprising, performing self-interference mitigation on the signal received from the relay.

\* \* \* \* \*

UNITED STATES PATENT AND TRADEMARK OFFICE
CERTIFICATE OF CORRECTION

PATENT NO.       : 8,457,549 B2
APPLICATION NO.  : 12/039927
DATED            : June 4, 2013
INVENTOR(S)      : Weng et al.

It is certified that error appears in the above-identified patent and that said Letters Patent is hereby corrected as shown below:

On Title Page 2, in item (56), under "OTHER PUBLICATIONS", in Column 1, Line 7, delete "Procceedings" and insert -- Proceedings --, therefor.

On Title Page 2, in item (56), under "OTHER PUBLICATIONS", in Column 1, Line 14, delete "Istanbule," and insert -- Istanbul, --, therefor.

On Title Page 2, in item (56), under "OTHER PUBLICATIONS", in Column 2, Line 17, delete "Gausian" and insert -- Gaussian --, therefor.

In the Specification

In Column 6, Line 1, delete "Si" and insert -- $s_1$ --, therefor.

In Column 11, Line 21, delete "$P_{r2}^x$," and insert -- $P_{r2}^x$ --, therefor.

In Column 13, Line 6, delete "si" and insert -- $s_1$ --, therefor.

Signed and Sealed this
Fifteenth Day of July, 2014

Michelle K. Lee
*Deputy Director of the United States Patent and Trademark Office*